(12) United States Patent
Alvarado et al.

(10) Patent No.: US 7,853,563 B2
(45) Date of Patent: Dec. 14, 2010

(54) UNIVERSAL DATA AGGREGATION

(75) Inventors: Billy Alvarado, Menlo Park, CA (US); Ido Ariel, Palo Alto, CA (US); Robert Paul van Gent, Redwood City, CA (US)

(73) Assignee: Seven Networks, Inc., Redwood City, CA (US)

( * ) Notice: Subject to any disclaimer, the term of this patent is extended or adjusted under 35 U.S.C. 154(b) by 0 days.

(21) Appl. No.: 11/217,203

(22) Filed: Aug. 31, 2005

(65) Prior Publication Data

US 2007/0027930 A1 Feb. 1, 2007

Related U.S. Application Data

(60) Provisional application No. 60/704,781, filed on Aug. 1, 2005.

(51) Int. Cl.
*G06F 7/00* (2006.01)
*G06F 17/00* (2006.01)

(52) U.S. Cl. .................. 707/616; 707/622; 707/632

(58) Field of Classification Search .................. 707/104, 707/104.1, 616, 622, 632, 999.107
See application file for complete search history.

(56) References Cited

U.S. PATENT DOCUMENTS

| | | |
|---|---|---|
| 222,458 A | 12/1879 | Connolly et al. |
| 447,918 A | 3/1891 | Strowger |
| 4,200,770 A | 4/1980 | Hellman et al. |
| 4,531,020 A | 7/1985 | Wechselberger et al. |
| 4,807,182 A | 2/1989 | Queen |
| 4,972,457 A | 11/1990 | O'Sullivan |
| 5,008,853 A | 4/1991 | Bly et al. |
| 5,220,657 A | 6/1993 | Bly et al. |
| 5,283,856 A | 2/1994 | Gross et al. |
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |
| 5,487,100 A | 1/1996 | Kane |
| 5,493,692 A | 2/1996 | Theimer et al. |
| 5,519,606 A | 5/1996 | Frid-Nielsen et al. |
| 5,555,376 A | 9/1996 | Theimer et al. |
| 5,574,859 A | 11/1996 | Yeh |
| 5,600,834 A | 2/1997 | Howard |
| 5,603,054 A | 2/1997 | Theimer et al. |
| 5,604,788 A | 2/1997 | Tett |
| 5,625,670 A | 4/1997 | Campana, Jr. et al. |
| 5,630,081 A | 5/1997 | Rybicki et al. |
| 5,631,946 A | 5/1997 | Campana, Jr. et al. |
| 5,632,018 A | 5/1997 | Otorii |
| 5,664,207 A | 9/1997 | Crumpler et al. |
| 5,666,530 A | 9/1997 | Clark et al. |

(Continued)

OTHER PUBLICATIONS

Lotus NotesPump Miscellaneous Paper (date unknown).

(Continued)

*Primary Examiner*—Jay A Morrison

(57) ABSTRACT

A system for aggregating and managing PIM data from multiple sources is provided. By aggregating various sources of data, the present system allow for the bridging of networked communities and organizations. Limitations of data aggregation as a result of proprietary and/or protocol concerns are overcome through the development of trusted relationships amongst users of the data aggregation and management system.

36 Claims, 4 Drawing Sheets

U.S. PATENT DOCUMENTS

| | | | |
|---|---|---|---|
| 5,666,553 A | 9/1997 | Crozier |
| 5,684,990 A | 11/1997 | Boothby |
| 5,689,654 A | 11/1997 | Kikinis et al. |
| 5,696,903 A | 12/1997 | Mahany |
| 5,701,423 A | 12/1997 | Crozier |
| 5,706,211 A | 1/1998 | Beletic et al. |
| 5,727,202 A | 3/1998 | Kucala |
| 5,729,735 A | 3/1998 | Meyering |
| 5,742,905 A | 4/1998 | Pepe et al. |
| 5,754,938 A | 5/1998 | Herz et al. |
| 5,758,088 A | 5/1998 | Bezaire et al. |
| 5,758,354 A | 5/1998 | Huang et al. |
| 5,778,346 A | 7/1998 | Frid-Nielsen et al. |
| 5,781,614 A | 7/1998 | Brunson |
| 5,781,901 A | 7/1998 | Kuzma |
| 5,790,790 A | 8/1998 | Smith et al. |
| 5,790,974 A | 8/1998 | Tognazzini |
| 5,794,210 A | 8/1998 | Goldhaber et al. |
| 5,802,312 A | 9/1998 | Lazaridis et al. |
| 5,802,454 A | 9/1998 | Goshay et al. |
| 5,806,074 A | 9/1998 | Souder et al. |
| 5,809,242 A | 9/1998 | Shaw et al. |
| 5,809,415 A | 9/1998 | Rossmann |
| 5,819,172 A | 10/1998 | Campana, Jr. et al. |
| 5,819,274 A | 10/1998 | Jackson et al. |
| 5,819,284 A | 10/1998 | Farber et al. |
| 5,826,269 A | 10/1998 | Hussey |
| 5,831,664 A | 11/1998 | Wharton et al. |
| 5,832,489 A | 11/1998 | Kucala |
| 5,838,252 A | 11/1998 | Kikinis |
| 5,838,973 A | 11/1998 | Carpenter-Smith |
| 5,857,201 A | 1/1999 | Wright, Jr. et al. |
| 5,884,323 A | 3/1999 | Hawkins et al. |
| 5,889,845 A | 3/1999 | Staples et al. |
| 5,892,909 A | 4/1999 | Grasso et al. |
| 5,903,723 A | 5/1999 | Beck et al. |
| 5,913,032 A | 6/1999 | Schwartz et al. |
| 5,924,096 A | 7/1999 | Draper et al. |
| 5,928,329 A | 7/1999 | Clark et al. |
| 5,937,161 A | 8/1999 | Mulligan et al. |
| 5,943,676 A | 8/1999 | Boothby |
| 5,948,066 A | 9/1999 | Whalen et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,987,440 A | 11/1999 | O'Neil et al. |
| 6,000,000 A | 12/1999 | Hawkins et al. |
| 6,003,070 A | 12/1999 | Frantz |
| 6,006,274 A | 12/1999 | Hawkins et al. |
| 6,016,478 A | 1/2000 | Zhang et al. |
| 6,018,762 A | 1/2000 | Brunson et al. |
| 6,023,700 A | 2/2000 | Owens et al. |
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |
| 6,052,563 A | 4/2000 | Macko |
| 6,052,735 A | 4/2000 | Ulrich et al. |
| 6,073,138 A | 6/2000 | de l'Etraz et al. |
| 6,073,142 A | 6/2000 | Geiger et al. |
| 6,073,165 A | 6/2000 | Narasimhan et al. |
| 6,085,166 A | 7/2000 | Beckhardt et al. |
| 6,085,192 A | 7/2000 | Mendez et al. |
| 6,088,677 A | 7/2000 | Spurgeon |
| 6,101,320 A | 8/2000 | Schuetze et al. |
| 6,101,480 A | 8/2000 | Conmy et al. |
| 6,101,531 A | 8/2000 | Eggleston et al. |
| 6,112,181 A | 8/2000 | Shear et al. |
| 6,119,014 A | 9/2000 | Alperovich et al. |
| 6,125,369 A | 9/2000 | Wu et al. |
| 6,125,388 A | 9/2000 | Reisman |
| 6,131,116 A | 10/2000 | Riggins et al. |
| 6,134,432 A | 10/2000 | Holmes et al. |
| 6,138,128 A | 10/2000 | Perkowitz et al. |
| 6,138,146 A | 10/2000 | Moon et al. |
| 6,141,664 A | 10/2000 | Boothby |
| 6,157,630 A | 12/2000 | Adler et al. |
| 6,161,140 A | 12/2000 | Moriya |
| 6,167,379 A | 12/2000 | Dean et al. |
| 6,175,831 B1 | 1/2001 | Weinreich et al. |
| 6,195,533 B1 | 2/2001 | Tkatch et al. |
| 6,198,696 B1 | 3/2001 | Korpi |
| 6,201,469 B1 | 3/2001 | Balch et al. |
| 6,202,085 B1 | 3/2001 | Benson et al. |
| 6,205,448 B1 | 3/2001 | Kruglikov et al. |
| 6,219,694 B1 | 4/2001 | Lazaridis et al. |
| 6,221,877 B1 | 4/2001 | Aronov et al. |
| 6,243,705 B1 | 6/2001 | Kucala |
| 6,246,875 B1 | 6/2001 | Seazholtz et al. |
| 6,247,135 B1 | 6/2001 | Feague |
| 6,256,666 B1 | 7/2001 | Singhai |
| 6,263,201 B1 | 7/2001 | Hashimoto et al. |
| 6,263,340 B1 | 7/2001 | Green |
| 6,269,369 B1 | 7/2001 | Robertson |
| 6,272,545 B1 | 8/2001 | Flanagin et al. |
| 6,275,850 B1 | 8/2001 | Beyda et al. |
| 6,289,212 B1 | 9/2001 | Stein et al. |
| 6,292,904 B1 | 9/2001 | Broomhall et al. |
| 6,295,541 B1 | 9/2001 | Bodnar et al. |
| 6,304,881 B1 | 10/2001 | Halim et al. |
| 6,308,201 B1 | 10/2001 | Pivowar et al. |
| 6,317,594 B1 | 11/2001 | Grossman et al. |
| 6,324,541 B1 | 11/2001 | de l'Etraz et al. |
| 6,324,542 B1 | 11/2001 | Wright, Jr. et al. |
| 6,324,544 B1 | 11/2001 | Alam et al. |
| 6,324,587 B1 | 11/2001 | Trenbeath et al. |
| 6,327,586 B1 | 12/2001 | Kisiel |
| 6,356,937 B1 | 3/2002 | Montville et al. |
| 6,363,352 B1 | 3/2002 | Dailey et al. |
| 6,370,566 B2 | 4/2002 | Discolo et al. |
| 6,380,959 B1 | 4/2002 | Wang et al. |
| 6,389,455 B1 | 5/2002 | Fuisz |
| 6,389,457 B2 | 5/2002 | Lazaridis et al. |
| 6,401,104 B1 | 6/2002 | LaRue et al. |
| 6,401,112 B1 | 6/2002 | Boyer et al. |
| 6,401,113 B2 | 6/2002 | Lazaridis et al. |
| 6,405,197 B2 | 6/2002 | Gilmour |
| 6,415,031 B1 | 7/2002 | Colligan et al. |
| 6,421,669 B1 | 7/2002 | Gilmour et al. |
| 6,421,781 B1 | 7/2002 | Fox et al. |
| 6,438,585 B2 | 8/2002 | Mousseau et al. |
| 6,442,589 B1 | 8/2002 | Takahashi et al. |
| 6,442,637 B1 | 8/2002 | Hawkins et al. |
| 6,446,118 B1 | 9/2002 | Gottlieb |
| 6,463,463 B1 | 10/2002 | Godfrey et al. |
| 6,463,464 B1 | 10/2002 | Lazaridis et al. |
| 6,487,557 B1 | 11/2002 | Nagatomo |
| 6,487,560 B1 | 11/2002 | LaRue et al. |
| 6,490,353 B1 | 12/2002 | Tan |
| 6,505,214 B1 | 1/2003 | Sherman et al. |
| 6,516,327 B1 | 2/2003 | Zondervan et al. |
| 6,526,506 B1 | 2/2003 | Lewis |
| 6,529,908 B1 | 3/2003 | Piett et al. |
| 6,549,939 B1 | 4/2003 | Ford et al. |
| 6,618,710 B1 | 9/2003 | Zondervan et al. |
| 6,639,693 B1 | 10/2003 | Ejiri et al. |
| 6,643,688 B1 | 11/2003 | Fuisz |
| 6,647,384 B2 | 11/2003 | Gilmour |
| 6,671,700 B1 | 12/2003 | Creemer et al. |

| | | |
|---|---|---|
| 6,671,702 B2 | 12/2003 | Kruglikov et al. |
| 6,691,757 B1 | 12/2003 | Multer et al. |
| 6,694,336 B1 | 2/2004 | Multer et al. |
| 6,697,807 B2 | 2/2004 | McGeachie |
| 6,701,378 B1 | 3/2004 | Gilhuly et al. |
| 6,708,221 B1 | 3/2004 | Mendez et al. |
| 6,714,965 B2 | 3/2004 | Kakuta et al. |
| 6,721,787 B1 | 4/2004 | Hiscock |
| 6,728,530 B1 | 4/2004 | Heinonen et al. |
| 6,728,786 B2 | 4/2004 | Hawkins et al. |
| 6,735,591 B2 | 5/2004 | Khan |
| 6,741,855 B1 | 5/2004 | Martin et al. |
| 6,757,362 B1 | 6/2004 | Cooper et al. |
| 6,757,696 B2 | 6/2004 | Multer et al. |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,804,707 B1 | 10/2004 | Ronning |
| 6,816,849 B1 | 11/2004 | Halt, Jr. |
| 6,820,088 B1 | 11/2004 | Hind et al. |
| 6,820,204 B1 | 11/2004 | Desai et al. |
| 6,847,974 B2 * | 1/2005 | Wachtel ................. 707/101 |
| 6,850,757 B2 | 2/2005 | Watanabe et al. |
| 6,859,212 B2 | 2/2005 | Kumar et al. |
| 6,871,220 B1 | 3/2005 | Rajan et al. |
| 6,879,985 B2 | 4/2005 | Deguchi et al. |
| 6,892,070 B2 | 5/2005 | Warrier et al. |
| 6,892,196 B1 | 5/2005 | Hughes |
| 6,895,558 B1 | 5/2005 | Loveland |
| 6,898,427 B1 | 5/2005 | Griffith et al. |
| 6,922,721 B1 | 7/2005 | Minborg et al. |
| 6,970,879 B1 | 11/2005 | Gilmour |
| 6,973,299 B2 | 12/2005 | Apfel |
| 7,047,202 B2 | 5/2006 | Jaipuria et al. |
| 7,069,308 B2 | 6/2006 | Abrams |
| 7,120,928 B2 | 10/2006 | Sheth |
| 7,139,555 B2 | 11/2006 | Apfel |
| 7,206,806 B2 | 4/2007 | Pineau |
| 7,289,971 B1 | 10/2007 | O'Neil |
| 7,461,071 B2 | 12/2008 | Fitzpatrick |
| 7,539,665 B2 | 5/2009 | Mendez |
| 2001/0023414 A1 * | 9/2001 | Kumar et al. ............. 705/35 |
| 2001/0032254 A1 | 10/2001 | Hawkins |
| 2002/0002478 A1 | 1/2002 | Swart et al. |
| 2002/0035556 A1 | 3/2002 | Shah et al. |
| 2002/0049828 A1 | 4/2002 | Pekarek-Kostka |
| 2002/0059201 A1 | 5/2002 | Work |
| 2002/0059457 A1 | 5/2002 | Ballard et al. |
| 2002/0068559 A1 | 6/2002 | Sharma et al. |
| 2002/0077077 A1 | 6/2002 | Rezvani et al. |
| 2002/0095319 A1 | 7/2002 | Swart et al. |
| 2002/0095328 A1 | 7/2002 | Swart et al. |
| 2002/0095391 A1 | 7/2002 | Swart et al. |
| 2002/0099613 A1 | 7/2002 | Swart et al. |
| 2002/0120766 A1 | 8/2002 | Okajima et al. |
| 2002/0133504 A1 * | 9/2002 | Vlahos et al. ............. 707/104.1 |
| 2002/0146129 A1 | 10/2002 | Kaplan |
| 2002/0161925 A1 | 10/2002 | Munger et al. |
| 2002/0186848 A1 | 12/2002 | Shaik |
| 2002/0194209 A1 | 12/2002 | Bolosky et al. |
| 2003/0005151 A1 | 1/2003 | Ullman et al. |
| 2003/0100326 A1 | 5/2003 | Grube et al. |
| 2003/0130984 A1 | 7/2003 | Quinlan et al. |
| 2003/0154212 A1 * | 8/2003 | Schirmer et al. ........ 707/103 R |
| 2003/0157947 A1 | 8/2003 | Fiatal et al. |
| 2003/0208559 A1 | 11/2003 | Velline et al. |
| 2003/0217098 A1 | 11/2003 | Bobde et al. |
| 2003/0217142 A1 | 11/2003 | Bobde |
| 2003/0235308 A1 | 12/2003 | Boynton et al. |
| 2004/0024795 A1 | 2/2004 | Hind et al. |
| 2004/0024892 A1 | 2/2004 | Creswell et al. |
| 2004/0103147 A1 * | 5/2004 | Flesher et al. ............. 709/204 |
| 2004/0172481 A1 | 9/2004 | Engstrom |
| 2004/0199497 A1 * | 10/2004 | Timmons .................. 707/3 |
| 2004/0236792 A1 | 11/2004 | Celik |
| 2005/0027716 A1 | 2/2005 | Apfel |
| 2005/0038863 A1 * | 2/2005 | Onyon et al. ............. 709/207 |
| 2005/0044144 A1 | 2/2005 | Malik et al. |
| 2005/0041793 A1 | 3/2005 | Fulton |
| 2005/0102257 A1 | 5/2005 | Onyon |
| 2005/0102328 A1 | 5/2005 | Ring |
| 2005/0117606 A1 | 6/2005 | Kim |
| 2005/0120084 A1 | 6/2005 | Hu et al. |
| 2005/1014421 | 6/2005 | Terada |
| 2005/0154798 A1 | 7/2005 | Forsyth |
| 2005/0193036 A1 * | 9/2005 | Phillips et al. ............. 707/202 |
| 2005/0228812 A1 * | 10/2005 | Hansmann et al. ......... 707/102 |
| 2005/0278307 A1 * | 12/2005 | Battagin et al. ............. 707/3 |
| 2005/0288006 A1 | 12/2005 | Apfel |
| 2006/0020580 A1 * | 1/2006 | Dettinger et al. ........... 707/3 |
| 2006/0020804 A1 | 1/2006 | Schleifer |
| 2006/0031114 A1 | 2/2006 | Zommers |
| 2006/0052091 A1 | 3/2006 | Onyon |
| 2006/0069686 A1 | 3/2006 | Beyda et al. |
| 2006/0143464 A1 * | 6/2006 | Ananthanarayanan et al. ................. 713/182 |
| 2006/0242210 A1 | 10/2006 | Ring |
| 2007/0027917 A1 | 2/2007 | Ariel |
| 2007/0027920 A1 | 2/2007 | Alvarado |
| 2007/0027921 A1 | 2/2007 | Alvarado |
| 2007/0027930 A1 | 2/2007 | Alvarado |
| 2007/0027886 A1 | 3/2007 | Gent |
| 2007/0130108 A1 | 6/2007 | Simpson, Jr. |
| 2007/0130217 A1 | 6/2007 | Linyard |
| 2007/0174433 A1 | 7/2007 | Mendez |
| 2007/0250591 A1 | 10/2007 | Milic-Frayling |
| 2008/0133641 A1 | 6/2008 | Gent |
| 2008/0134292 A1 | 6/2008 | Ariel |
| 2008/0140665 A1 | 6/2008 | Ariel |
| 2009/0119266 A1 | 5/2009 | Fitzpatrick |
| 2009/0125523 A1 | 5/2009 | Fitzpatrick |
| 2009/0144632 A1 | 5/2009 | Mendez |

OTHER PUBLICATIONS

NotesPump 1.0 Release Notes (date unknown).
Lotus Notes-Notes Administration Help Screen Shot (Date Unknown).
Chapter 13-1, "Anatomy of a Note ID," (date unknown).
About NotesPump (date unknown).
Lotus Development Corporation, "Lotus Quick Reference for SmartIcons, Lotus Notes Release 3.1," (date unknown).
Lotus Development Corporation, "Lotus Quick Reference for Windows and Presentation Manager, Lotus Notes Release 3," (date unknown).
Lotus Development Corporation, "Lotus Quick Reference for Macintosh, Lotus Notes Release 3.0," (date unknown).
Lotus Development Corporation, "Lotus Quick Reference for Application Developers, Lotus Notes Release 3," (date unknown).
Lotus Development Corporation, "Lotus Customer Support Service, Lotus Notes Customer Support Guides," (date unknown).
Lotus Software Agreement for "Notes 4.0 NA DKTP Client UPG," Part No. 38985, (date unknown).
Lotus Development Corporation, Lotus Notes 4.0, "Lotus Customer Support, North American Guide," (date unknown).
Lotus Development Corporation, Lotus Notes 4.1 Starter Pack, "Lotus Customer Support, North American Guide," (date unknown).
Lotus Development Corporation, "LotusScript Classes for Notes Release 4," (date unknown).
Allchin, James E., "An Architecture for Reliable Decentralized Systems," UMI Dissertation Services, Copyright 1983.
Lotus Development Corporation, "Lotus Notes Release 3.1: The Groupware Standard, Administrator's Guide—Server for NetWare, OS/2, and UNIX," 1989.

Lotus Development Corporation, "Lotus Notes Release 3.1: The Groupware Standard, Site and Systems Planning Guide," 1991.
Wilcox, Adam A., "PC Learning Labs Teaches Lotus Notes 3.0: The Quick and Easy Way to Learn," Ziff-Davis Press, 1993.
Lotus Development Corporation, "Lotus Notes Release 3.3: Start Here, Workstation Install for Windows, OS/2 and Macintosh," 1993.
Augun, Audry, "Integrating Lotus Notes with Enterprise Data," "Lotus Notes Advisor," Advisor Publications, Jul. /Aug. 1996, pp. 22-25.
"Lotus Notes Advisor," Advisor Publications, Aug. 1996.
IBM Corporation, "Secrets to Running Lotus Notes: The Decisions No One Tells You How to Make," Oct. 1996.
"Lotus Notes Advisor," Advisor Publications, Oct. 1996.
Opyt, Barbara, et al., "Use the Internet as Your Lotus Notes WAN," "Lotus Notes Advisor," Advisor Publications, Nov./Dec. 1996, pp. 17-20.
"Lotus Notes Advisor," Advisor Publications, Dec. 1996.
Swedeen, Bret, et al., "Under the Microscope: Domino Replication," "LDD Today," Oct. 1, 1998.
Lotus Development Corporation, "Lotus Inside Notes: The Architecture of Notes and the Domino Server," 2000.
"The History of Notes and Domino," Lotus Developer Domain, Lotus, Sep. 29, 2003.
Federal Information Processing Standards Publication 180-2, Aug. 1, 2002.
Federal Information Processing Standards Publication 197, Nov. 26, 2001.
Lotus Development Corporation, "Lotus Notes Release 3.1: Administrator's Guide—Server for Windows," 1993.
Lotus Development Corporation, "Lotus Notes Release 3.1: The Groupware Standard, Customer Services Application Guide," 1994.
Lotus Development Corporation, "Lotus Notes Release 3.1: The Groupware Standard, Getting Started with Application Development," 1994.
Lotus Development Corporation, "Lotus Notes Release 3.1: The Groupware Standard, Network Driver Documentation," 1994.
Kornblith, Polly R., "Lotus Notes Answers: Certified Tech Support," Covers Lotus Notes Release 3, Osborne McGraw-Hill, 1994.
Freeland, Pat and Londergan, Stephen, "Lotus Notes 3/3.1 for Dummies (TM)," IDG Books Worldwide, 1994.
Gewirtz, David, "Lotus Notes 3 Revealed! Your Guide to Managing Information and Improving Communication Throughout Your Organization," Prima Publishing, 1994.
Shafran, Andrew B., "Easy Lotus Notes for Windows (TM)," Que (R) Corporation, 1994.
Lotus Development Corporation, "Lotus Notes Release 3.3: The Groupware Standard, Administration," 1994.
Mcmullen, Melanie, Editor, "Network Remote Access and Mobile Computing," Miller Freeman Inc., 1994.
Lotus Development Corporation, "Lotus Notes Internet Cookbook for Notes Release 3," Jan. 16, 1996.
Wong, Harry, "Casahl's Replic-Action: Delivering True Notes/DBMS Integration," "The View Technical Journal for Lotus Notes(R) Software," vol. 2, Issue 1, Jan./Feb. 1996, pp. 33-50.
"Lotus Notes Advisor," Advisor Publications, Jan./Feb. 1996.
IBM International Technical Support Organization, "Lotus Notes Release 4 In a Multiplatform Environment," Feb. 1996.
Lotus Development Corporation," Lotus Notes Internet Cookbook for Notes Release 4," Feb. 14, 1996.
Blaney, Jeff, "You Can Take it with you: An Introduction to Mobile Computing with Notes R4," "The View Technical Journal for Lotus Notes(R) Software," vol. 2, Issue 1, Jan./Feb. 1996, pp. 22-32.
"Lotus Notes Advisor," Advisor Publications, Apr. 1996.
Frenkel, Garry, "Pumping for Info: Notes and Database Integration," "Network Computing," May 1, 1996, pp. 76-84.
Lotus Development Corporation, "Lotus Notes Knowledge Base," "Firewall Security Overview and How Firewalls Relate to Lotus Notes," May 22, 1996.
"Lotus Notes Advisor," Advisor Publications, Jun. 1996.
IntelliLink Corporation, "IntelliLink (R) For Windows User's Guide," Version 3.0, 1994.
Lotus Development Corporation, "Lotus Notes Release 4: InterNotes Web Navigator Administrator's Guide," 1995.

Lotus Development Corporation, "Lotus InterNotes Release 4 Web Publisher: InterNotes Web Publisher Guide," 1995.
Lotus Development Corporation, "Lotus Notes Release 4 Install Guide for Servers," 1995.
Lotus Development Corporation, "Lotus Notes Release 4.1 Release Notes," 1995.
Lotus Development Corporation, "Lotus Notes Release 4 Migration Guide," 1995.
Lotus Development Corporation, "Lotus Notes Release 4 Database Manager's Guide," 1995.
Lotus Development Corporation, "Lotus Notes Release 4 Install Guide for Workstations," 1995.
Lotus Development Corporation, "Lotus Step by Step: A Beginner's Guide to Lotus Notes," 1995.
Lotus Development Corporation, "Lotus Notes Release 4.5, Network Configuration Guide," 1995.
Netscape Communications Corporation, "Installation Guide, Netscape Mail Server, Version 2.0 for Unix," 1995.
Netscape Communications Corporation, "User's Guide, Netscape Mail Server, Version 2.0," 1995.
Netscape Communciations Corporation, "Administrator's Guide, Netscape Mail Server, Version 2.0," 1995.
Pyle, Hugh, "The Architecture of Lotus Notes," Lotus Notes Advisor, Advisor Publications, Premiere Issue 1995, pp. 18-27.
"Lotus Notes Advisor," Advisor Publications, Jun. 1995.
IBM, "The Architecture of Lotus Notes," White Paper, No. 114654, modified date: May 31, 1995.
Lotus Development Corporation, "Lotus Notes Knowledge Base," "What is the Notes Replicator," Jul. 5, 1995.
"Lotus Notes Advisor," Advisor Publications, Aug. 1995.
Grous, Paul J., "Creating an Managing a Web Site with Lotus' InterNotes Web Publisher," "The View Technical Journal for Lotus Notes (R) Software," vol. 1, Issue 4, Sep./Oct. 1995, pp. 3-18.
"Lotus Notes Advisor," Advisor Publications, Oct. 1995.
Cole, Barb, "Lotus airs Notes-to-database integration tool," www.looksmart.com, Oct. 2, 1995.
Lotus Development Corporation, "Lotus Notes Knowledge Base," "Lotus Announces Lotus NotesPump 1.0," Oct. 31, 1995.
Lotus Development Corporation, "Lotus Notes Knowledge Base," Lotus NotesPump 1.0 Q & A, Oct. 31, 1995.
Lotus Development Corporation, "Lotus Notes Knowledge Base, "Lotus NotesPump: Database Integration for Lotus Notes, Oct. 31, 1995.
Lotus Development Corporation, "Lotus Notes Knowledge Base," "How to Set Up "Firewall" Protection for a Notes Domain," Nov. 6, 1995.
Pyle, Lisa, "A Jump Start to the Top Ten R3-to-R4 Migration Considerations," "Lotus Notes Advisor," Advisor Publications, vol. 1, No. 5, Nov./Dec. 1995, pp. 3-20.
"Lotus Notes Advisor," Advisor Publications, Dec. 1995.
Lotus Development Corporation, "Lotus Notes Release 4 Install Guide for Workstations," First Revision, 1996.
Lotus Development Corporation, "Lotus Notes Release 4 Programmer's Guide Part 1," 1995.
Lotus Development Corporation, Lotus Notes Release 4 Programmer's Guide Part 2, 1995.
Lotus Development Corporation, "Lotus Notes Release 4 Administrator's Guide," 1995.
Lotus Development Corporation, "Lotus Notes Release 4 Deployment Guide," 1995.
Lotus Development Corporation, "Lotus Notes Release 4 Application Developer's Guide," 1995.
Lotus Development Corporation, "Lotus Notes Release 4 InterNotes Web Navigator User's Guide," 1995.
Lotus Development Corporation, "Lotus Notes Release 4 Release Notes," 1995.
Lotus Development Corporation, "Lotus Notes Release 4.5 Install Guide for Workstations," 1995.
Lotus Development Corporation, "Release Notes, Lotus Notes Release 3.30, Windows, OS/2, and Macintosh," 1995.
Brown, Kevin, et al., "Mastering Lotus(R) Notes (R)," SYBEX Inc., 1995.

Lotus Development Corporation, "Lotus Step by Step: A Beginner's Guide to Lotus Notes," First Revision, 1996.

Freeland, Pat and Londergan, Stephen, "Lotus Notes Release 4 for Dummies(TM)," IDG Books Worldwide, 1996.

Kreisle, Bill, "Teach yourself. . .Lotus Notes 4," MIS:Press, 1996.

Marmel, Elain, "Easy Lotus(R) Notes Release 4.0," Que Corporation, 1996.

Lotus Development Corporation, "Lotus Notes Server Up and Running!, Release 4," 1996.

Falkner, Mike, "How to Plan, Develop and Implement Lotus Notes in Your Organization," Wiley Computer Publishing, John Wiley and Sons., Inc., 1996.

Lamb, John P., et al., "Lotus Notes Network Design," McGraw-Hill, 1996.

Tamura, Randall A., et al., "Lotus Notes 4 Unleashed," Sams Publishing, 1996.

Dahl, Andrew, "Lotus Notes 4 Administrator's Survival Guide," Sams Publishing, 1996.

Netscape Communications Corporation, "Administrator's Guide, Netscape News Server, Version 2.0," 1996.

Bedell, Doug, "I Know Someone Who Knows Kevin Bacon: Meeting Your New Best Friends; Six Degrees Widens Your Contacts. . ." Dallas Morning News, Oct. 27, 1998.

Milgram, Stanley, "The Small-World Problem," Psychology Today (1967), pp. 60-67.

Kleinberg, Jon, "The Small-World Phenomenon: An Algorithmic Perspective," Cornell Computer Science Technical Report (1999).

Phillips, Joshua et al., "Modeling the Intelligence Analysis Process for Intelligent User Agent Development," Research and Practice in Human Resource Management 9(1), 59-73.

Microsoft Computer Dictionary (5th Ed.): synchronization.

Microsoft Computer Dictionary (5th Ed.): access.

Andriana Vivacqua, et al., "Profiling and Matchmaking Strategies in Support of Opportunistic Collaboration," Conference on Cooperative Information Systems, Nov. 3-7, 2003.

"The Social Semantic Desktop", by Decker et al., DERI Technical Report May 2, 2004.

"A Multi-Dimensional, Unified User Model for Cross-System Personalization", by Niederee et al., AVI'04, May 25, 2004, Gallipoli, Italy.

* cited by examiner

UNIVERSAL DATA AGGREGATION

CROSS-REFERENCE TO RELATED APPLICATIONS

The present application claims the priority benefit of U.S. provisional patent application No. 60/704,781 filed Aug. 1, 2005 and entitled "Networked Personal Information Management," the disclosure of which is incorporated herein by reference. The present application is related to U.S. patent application Ser. No. 10/339,368 filed Jan. 8, 2003 and entitled "Connection Architecture for a Mobile Network." The present application is also related to U.S. patent application Ser. No. 10/339,369 filed Jan. 8, 2003 and entitled "Secure Transport for Mobile Communication Network." The related applications are commonly assigned and are incorporated herein by reference.

The present application is also related to U.S. patent application Ser. No. 11/229,340 filed Sep. 16, 2005 and entitled "Linking of Personal Information Management Data"; U.S. patent application Ser. No. 11/303,048 filed Dec. 14, 2005 and entitled "Publishing Data in an Information Community"; U.S. patent application Ser. No. 11/362,488 filed Feb. 24, 2006 and entitled "Context-Aware Data Presentation"; and U.S. patent application Ser. No. 11/363,912 filed Feb. 27, 2006 and entitled "Context Based Action."

BACKGROUND OF THE INVENTION

1. Field of the Invention

The present invention relates to control and utilization of personal information management (PIM) data such as calendar and contact information in the context of personal and professional activities. More specifically, the present invention relates to control and utilization of PIM data in the context of mobile devices such as smart phones and PDAs.

2. Description of Related Art

Presently available groupware applications and other related collaboration products that facilitate shared work and access to documents and information (e.g., data pools) are, to a certain extent, closed networks. That is, certain information cannot be shared amongst users of different groupware products because the protocols setting forth the rules and standards by which communication of data takes place are different. For example, an individual using Microsoft® Outlook® as an e-mail client via a Microsoft® Exchange® Server can exchange e-mail messages with an individual using a Lotus® Notes client via an IBM® Lotus® Domino Server. Those same users cannot, however, access the contact or calendar data of one another due to protocol differences between an Exchange® Server and a Domino Server.

There have been some software applications that have attempted to bridge the protocol gap such as the Trillian instant messaging (IM) client from Cerulean Studios. Trillian is a multi-protocol chat client that supports AOL® Instant Messenger, ICQ®, MSN® Messenger, Yahoo!® Messenger and IRC through a single interface by enabling simultaneous connections to existing instant messaging networks via a direct connection to whatever servers actually power the messaging network. Trillian, however, cannot share most types of corporate or personal data as it is limited to Instant Messaging.

There is a need in the art for a system that allows for the aggregation and access of all types of PIM data in a centralized matter notwithstanding network protocols or other proprietary limitations of particular PIM data resources. Through the aggregation of this data in a centralized manner, the PIM data can then be manipulated or utilized by a particular user or shared amongst a family of users in order to allow for more informed personal and professional relationships. Through the aggregation and sharing of PIM data without regard for protocol and/or proprietary limitations, larger communities may be built between individuals and businesses.

SUMMARY OF THE INVENTION

An exemplary embodiment of the present invention provides for a data aggregation server. The exemplary data aggregation server may aggregate data from a number of users in a community of users. Data may be acquired from these users by a module at the server configured to acquire such data. A mobile device may be coupled to the data aggregation server. Data may be acquired from users that a part of an integrated data environment as well as from users that are outside of that environment. Acquisition of data from outside that environment may include the user of proxied credentials. A mobile device in communication with the server may selectively access the data acquired by the module and maintained in storage, the storage being coupled to the data aggregation server.

A further embodiment of the present invention provides a method of aggregating data. In accordance with this method, a query as to the availability of data sources in an integrated data environment is made; data is acquired from the available data sources in the integrated data environment. A query is also made as to the availability of data sources outside the integrated data environment. In response to a determination of the availability of data sources outside the integrated data environment, proxied credentials are provided to access the available data sources outside the integrated data environment. Data is acquired from the available data sources outside the integrated data environment. Data acquired from the available data source in and outside of the integrated data environment is aggregated at a storage medium coupled to a data management server. The data management server makes the aggregated data accessible to one or more users of the server.

A still further embodiment of the present invention provides a computer-readable storage medium having embodied thereon instructions for causing a computing device to execute a method for aggregating data. The instructions include querying the availability of data sources in an integrated data environment and acquiring data from the available data sources. The instructions further include querying the availability of data sources outside the integrated data environment. In response to a determination of the availability of data sources outside the integrated data environment, proxied credentials are provided to access the available data sources outside the integrated data environment. The instructions further include acquiring data from the available data sources outside the integrated data environment. Data acquired from the available data source in and outside of the integrated data environment is aggregated at a storage medium coupled to a data management server. The data management server makes the aggregated data accessible to one or more users of the server.

DETAILED DESCRIPTION

Figure 1:
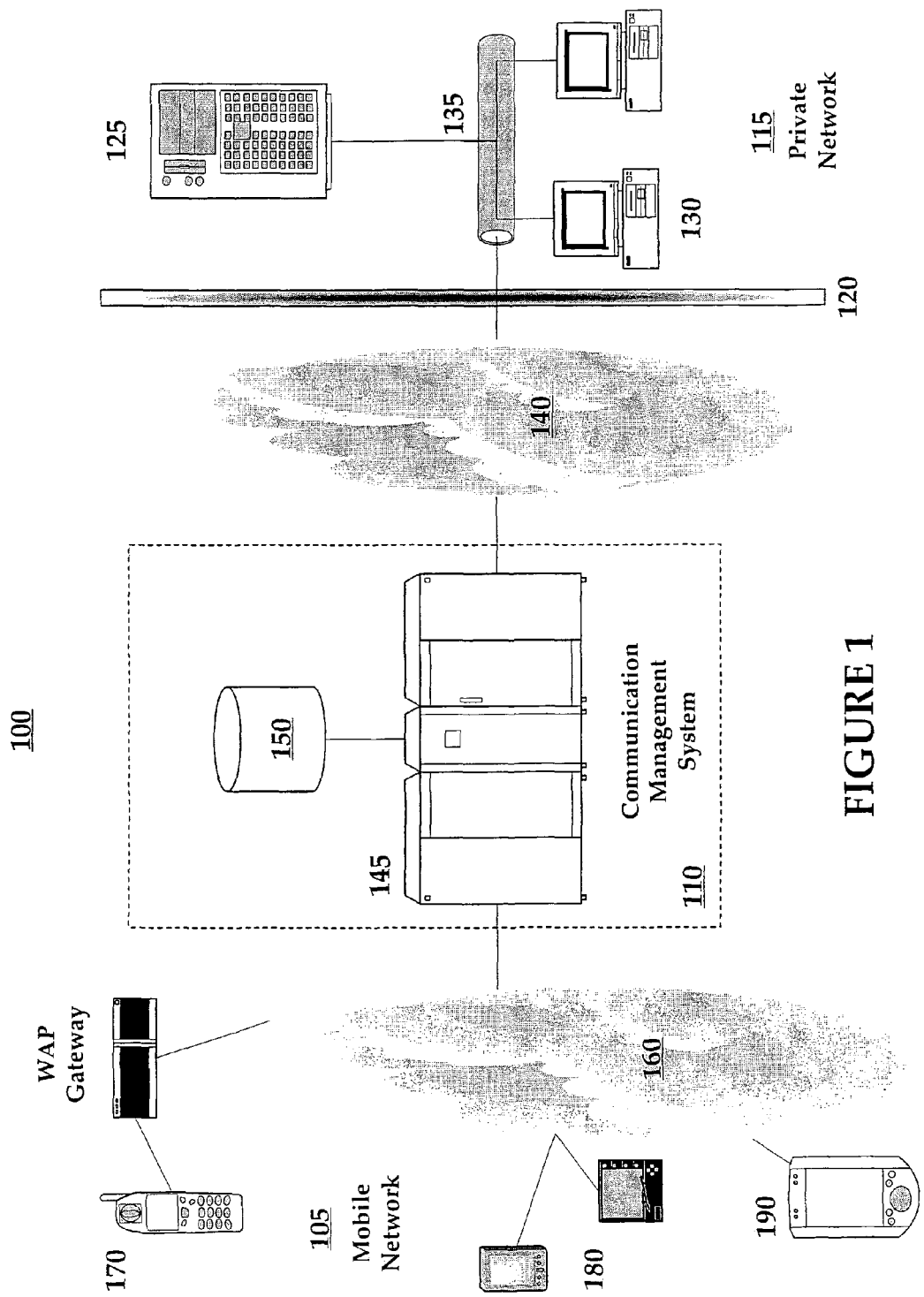
FIG. 1 is an illustration of an exemplary communication network architecture comprising a mobile network, a communication management system and a private network.

FIG. 1 illustrates an exemplary communication network architecture 100. Communication network architecture 100 comprises a mobile network 105, a communication management system 110 and a private network 115. Communication management system 110 generally manages communications between the mobile network 105 and the private network 115.

A network should generally be understood as a group of associated devices (e.g., computing devices) that are coupled to one another via a communications facility. For example, mobile network 105 is illustrative of an exemplary group of mobile computing devices such as mobile phones, smart phones, PDAs, tablet PCs and WI-FI equipped laptops. Private network 115 is illustrative of an enterprise server and various workstation clients such as those found in any number of corporate entities and businesses. Private network 115 may also be embodied as a single computer (e.g., a home computer) coupled to a series of other computing devices via an Internet connection as provided by an ISP. Mobile network 105, communication management system 110, and private network 115 may also be reflective of a network in that a variety of computing devices are coupled to one another via a variety of communications channels (e.g., mobile telephone base stations, Internet and so forth). In that regard, networks should be interpreted as being inclusive rather than exclusive.

Private network 115 may be separated from the communication management system 110, mobile network 105 and any other networks by a firewall 120. Firewall 120 is traditionally a set of software applications located at a network gateway server (not shown) to protect the resources of the private network 115 (e.g., corporate or private data) from unauthorized users and/or malicious data entities (e.g., viruses and spy-ware) that might exist outside the private network 115. Firewall 120 may also be a security policy used with the aforementioned software application. Firewall 120, in the case of a personal computer (PC), may be software directly implemented on the PC.

The mobile network 105 comprises a variety of mobile devices that may communicate over the Internet through, for example, a wireless or landline mobile network. A variety of mobile networks and communications channels for enabling Internet access are well known in the art.

Private network 115 may be any enterprise network, individual user network, or local computer system that maintains data for one or more users. In an exemplary embodiment, the private network 115 may comprise an enterprise server 125 configured to be accessed by multiple PCs 130. In one example, the enterprise server 125 may be a Microsoft® Exchange®D server and the PCs 130 may access data such as electronic mail (e-mail) on the enterprise server 125 through a client software application (not shown) such as Microsoft® Outlook®. The enterprise server 125 can store e-mail mailboxes, contact lists, calendars, tasks, notes, or any other type of local data or electronic documents (e.g., word processing documents, PowerPoint® presentations, Excel spreadsheets). PCs 130 are coupled to the enterprise server 125 over a Local Area Network (LAN) 135, which is coupled to a Wide Area Network (WAN) 140 such as the Internet.

In some embodiments, PCs 130 may operate independently of enterprise server 125 (e.g., a home personal computer or a business enterprise without an enterprise server 125). PC 130 may comprise or be coupled to memory (not shown) to store e-mail mailboxes, contact lists, calendars, tasks, notes, or any other type of local data or electronic document that might otherwise be stored on enterprise server 125. In these embodiments, a personal client application (not shown) may also provide for communication with a management server 145 or a Personal Client Server (PCS) (not shown) coupled to the management server 145. This latter configuration would be functionally similar to an enterprise client (not shown) at the enterprise server 125 configured to allow communication with the management server 150. The particularities of a given communications architecture implementation are left to the requirements of a user, their particular network and available communications hardware and software. In that regard, the present disclosure's reference to a PCS should not be interpreted as an operational necessity but an alternative embodiment of the present invention.

Communication management system 110 comprises at least one management server 140 configured to manage transactions between mobile devices in the mobile network 105 and the private network 115. A user database 150, which may be coupled to or directly integrated with management server 145, comprises configuration information for different users. For example, the user database 150 may comprise login data for users in the private network 115 and/or mobile network 105.

Communication management system 110 may further comprise one or more Smart Device Servers (SDS) (not shown) and/or one or more of the aforementioned PCS (not shown) in addition to any other specially configured equipment that might be necessary to enable communications between the mobile network 105 and private network 115 in addition to communications with the communication management system 110. Optional SDS (not shown), for example, manages communications with particular smart mobile devices 190 (e.g., smart phones like the Treo 600) whereas an optional PCS (not shown) may manage communications with personal clients (not shown) that may reside on PC 130.

Mobile devices in the mobile network 105 may comprise cellular phones 170 comprising Wireless Application Protocol (WAP) interfaces configured to communicate with management server 145 through a WAP gateway. Other mobile devices may include tablet PCs, PDAs and Internet kiosks 180 or any smart mobile device 190 operating as a communication start/end-point.

Communication channels 160 are any communication pathway that allow the aforementioned mobile devices to communicate between the mobile network 105 with the Internet and/or any other communication network. For example, communication channel 160 may be a landline, cellular channels, 802.11 wireless channels, or satellite channels.

In an independent PC configuration, the personal client application (not shown) installed on the PC 130 establishes a data connection between the PC 130 and management server 145 over the appropriate networks (e.g., LAN 135 and WAN 140) as well as any necessary intermediate hardware or software applications such as an optional PCS (not shown). The data connection between the PC 130 and management server 145, in one embodiment, is initiated by the personal client as an outbound connection, which is then authenticated by the management server 145. For example, the personal client on PC 130 may present authentication information to the management server 145, which the management server 145 may attempt to reconcile with information in the user database 150. A similar connection process occurs in the context of an enterprise server 125 with an enterprise client and a related data connection.

If the management server 145 authenticates the personal client or enterprise client, the data connection is established through firewall 120 (if applicable) with the communication management system 110, which is outside the private network 115. Management server 145, after having established the data connection, may provide connection sharing information or other communication configuration parameters as might be related to an associated mobile device in the mobile network 105.

Management server 145 and the related client at the enterprise server 125 or PC 130 may then enter a quiescent mode until a transaction (e.g., the arrival of data at the server 125 or PC 130) that requires the transfer of data between the private network 115 and mobile network 105 (e.g., pushing of e-mail). In some embodiments, if the data connection is inadvertently terminated, the client at the enterprise server 125 or PC 130 will automatically reestablish a data connection with the management server 145.

The data connection may be maintained even when there is no exchange of data between the management server 145 and mobile network 105 and an associated mobile device. In one embodiment, the data connection is a Transmission Control Protocol/Internet Protocol (TCP/IP) connection although any connection protocol may be used that provides connectivity between the private network 115 and communication management system 110. Alternative embodiments may utilize a proxy server and/or a Secure Socket Layer (SSL) for the purposes of maintaining the security of information transmitted between the private network 115 and communication management system 110.

After establishing the data connection, a mobile data connection may be established between the mobile device in the mobile network 105 and the management server 145. The mobile data connection may, in some embodiments, be established prior to and/or maintained notwithstanding the presence of a data connection between the private network 115 and communication management system 110. For example, a mobile device in mobile network 105 may seek to establish and maintain a connection as soon as a communication channel 160 is available that facilitates establishing that connection. The mobile data connection may be subject to polling (e.g., accessing the communication management system 110 on a regularly scheduled basis); manual synchronization and/or the generation of data at the mobile device or a request for data at the mobile device.

The mobile connection, in some embodiments, may also be initiated by the communication management system as a result of the arrival of data at the enterprise server 125 or PC 130 that needs to be delivered to the mobile device via the communication management system 110 and appropriate communication channel 160 (e.g., arrival of e-mail to be pushed to the mobile device).

After the mobile connection is established, the mobile device 170 may access e-mail and other PIM data at the enterprise server 125 or PC 130 via an enterprise client or personal client, respectively. In some embodiments, the use of an optional SDS (not shown) to establish connectivity between the communication management system 110 and a smart device 190 may be required as may an optional PCS (not shown) for establishing connectivity between communication management system 110 and PC 130.

Mobile device connection, as noted, may be initiated by a mobile device in the mobile network 105. For example, a mobile user's username and password for accessing the communication management system 110 may be established in user database 150 when the user enrolls with the communication management system 110. The user would subsequently be required to provide this information when their mobile device attempts to automatically or manually access the communication management system 110. A username/password combination is not necessarily required to access the management system 110 as other security credentials may be utilized to establish access.

For example, an authentication token may be established on the mobile device following the device's providing of the proper security credentials (e.g., a user name and password). That authentication token may be recognized by the communication management system 110 with regard to establishing future access so that the re-entry of a username and password is not required for subsequent access. The authentication token may be permanent or set to expire after a certain period of time or a certain number of uses. Certificate mapping (using SSL certificates), Host-IP access control (white-listing and black-listing certain IP addresses or networks) and device location may also be used to establish access to the communication management system 110. In the latter example, the position of a device may be established by access to a particular base station (in the case of a cellular device) or a GPS-transceiver may identify the position of the device. If the device is out of a specified region, the communication management system 110 may deny access (e.g., a user designates denial of access if their mobile device is taken overseas or out of state as that location suggests it has been stolen).

Security credentials may also be provided through a combination of various mobile identifiers, for example, Mobile Identification Numbers (MIN), International Mobile Subscriber Identity (IMSI) and Electronic Serial Number (ESN). Additional layers of security may be provided through the use of a secure hash algorithm or a Virtual Private Network (VPN). Notwithstanding the particular access methodology, the credentials are ultimately verified by the management server 145 or some related software/hardware (e.g., optional SDS (not shown)) and possibly with further regard to user information stored in the user database 150.

Similar authentication methodologies may be utilized for establishing a data connection between the communication management system 110 and a computing device in the private network 115.

Once connectivity is established by the mobile device, the user may access e-mail, files or Personal Information Management (PIM) data residing at the enterprise server 125, PC 130 or communication management system 110 at the management server 145.

Management server 145 may be configured to reformat and render local data from the private network 115 according to the particularities of the user's mobile device in addition to functioning as a routing engine for data transactions between the mobile devices of the mobile network 105 and the private network 115.

Figure 2:
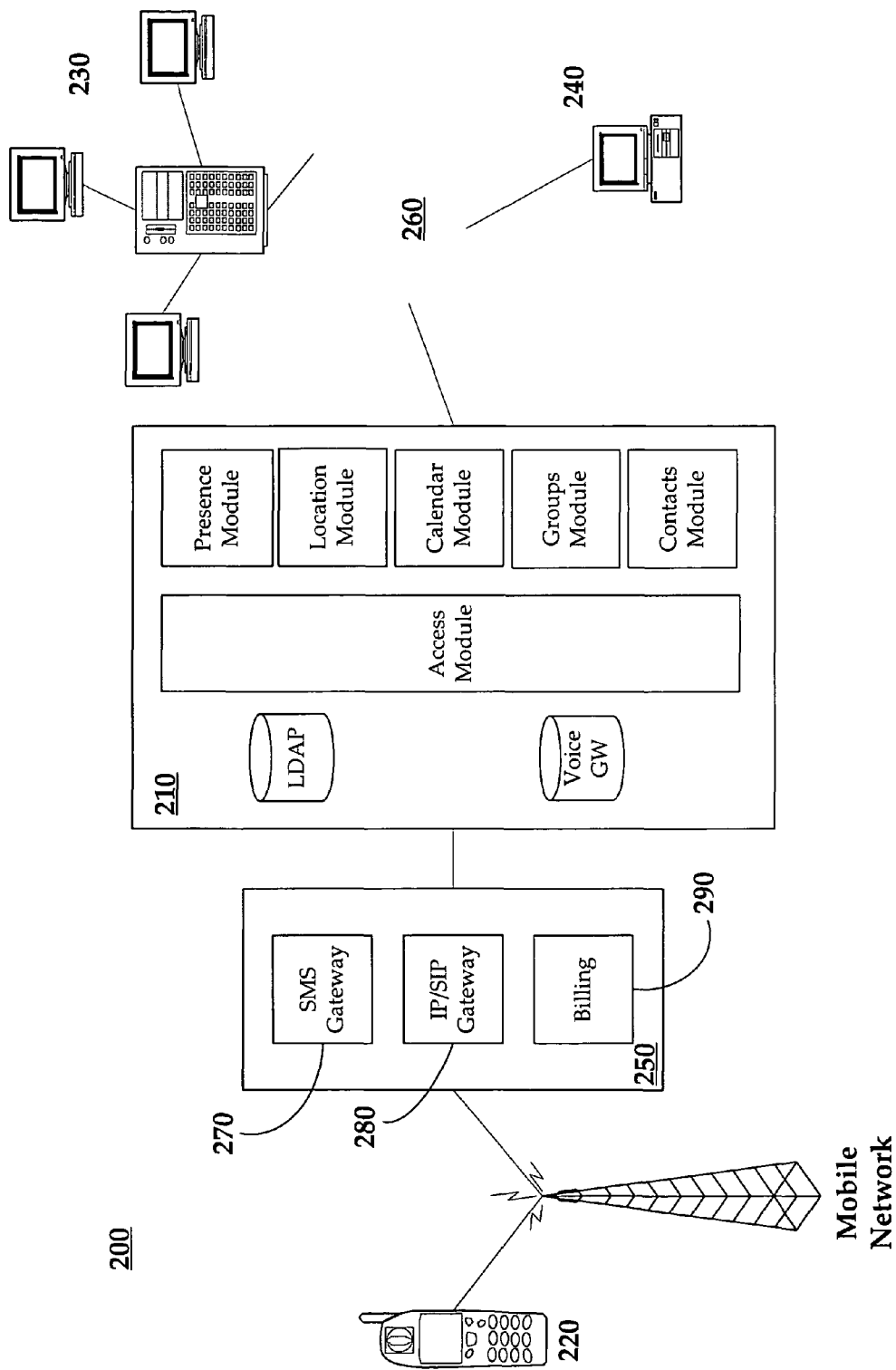
FIG. 2 is an illustration of an exemplary dynamic data aggregation and management system comprising an exemplary data aggregation server, an exemplary client device and various sources of Personal Information Management (PIM) data.

FIG. 2 is an illustration of a data aggregation and management system 200 comprising an exemplary data aggregation server 210, an exemplary client device 220 and various sources of PIM data including an enterprise server 230 and a PC 240. Various intermediate operations and services 250 are also shown. The intermediate operations and services 250 may be directly integrated as a part of data aggregation server 210, may stand alone as a third-party service accessible by data aggregation server 210 and/or device 220 or be remotely coupled to the data aggregation server 210 (e.g., physically separate from the physical architecture of the data aggregation server 210); for example, a switch or customer service center.

PC 240 may be a desktop PC coupled to the data aggregation server 210 by way of client connection software like SEVEN Personal Edition available from SEVEN Networks, Inc. of Redwood City, Calif. This client connection software may provide a secure link to data stored at the. PC 240 such as e-mail, personal contacts and documents via and other PIM data: A client device 220 such as a smart phone or other mobile device may access this data via the data aggregation server 210 and/or a communications management system like that described in FIG. 1 and any variety of communication networks (e.g., wireless). PC 240 and its client connection software may be configured with certain features such as end-to-end encryption to ensure secure transmission of personal data. PC 240 and its client connection software may also offer notification functionalities to inform a user that new content (e.g., e-mail) has arrived at the PC 240 and should be forwarded to client device 220 via, for example, a push operation through the data aggregation server 210 and/or a communications management system.

Enterprise server 230 may be a corporate enterprise server configured to manage e-mail, data and various applications. Enterprise server 230 (and PC 240) may utilize a firewall (not shown) like that described in FIG. 1. Although a firewall is described, a firewall is not necessary for the operation and interaction of the enterprise server 230 (or PC 240) with data aggregation server 210 and/or client device 220.

Enterprise server 230 is coupled to the data aggregation platform 210 via appropriate client server software, which, like the client software of PC 240, intermediately couples the enterprise server 230 to client device 220 via a data connection to the data aggregation server 210 and/or a communications management system like that described in FIG. 1. An example of such software is SEVEN Server Edition available from SEVEN Networks, Inc. of Redwood City, Calif. Additional software installed at the enterprise server 230 may provide various users (e.g., clients or workstations) the ability to interact with the enterprise server 230 and have access to application data (e.g., email).

Data aggregation server 210 comprises the various modules necessary to aggregate and manage certain PIM data. Data aggregation server 210 may be directly integrated with the management server (145) of FIG. 1 or otherwise coupled to the communication management system (110) described in FIG. 1.

Data aggregation server 210 is optionally coupled to the enterprise server 230 and/or PC 240 via network 260. Network 260 further enables communications access to additional sources of PIM data like those described in FIG. 4 below. Access to an enterprise server 230 or PC 240 by the data aggregation server 210 is not required for the operation of the data aggregation server 210. The data aggregation server 210 may operate independently of an enterprise server 230 and PC 240 so long as certain information required by the data aggregation server 210 and an associated client device 220 is otherwise available (e.g., PIM data such as calendar and/or contact data). Coupling the data aggregation server 210 to PC 240 and/or enterprise server 230 merely provides additional or enhanced functionality that might otherwise be unavailable absent such a coupling.

Similarly, the e-mail redirection and data access functionality offered by connection software at PC 240 and enterprise server 230 may also operate independent of the data aggregation server 210. In an embodiment of the present invention, data aggregation server 210 and PC 240 and/or enterprise server 230 may operate in parallel without ever being 'aware' of the operation of the other. Another embodiment of the present invention, however, may integrate certain features of data aggregation server 210 with enterprise server 230 and/or PC 240 to provide for the aforementioned enhanced functionality.

Figure 4:
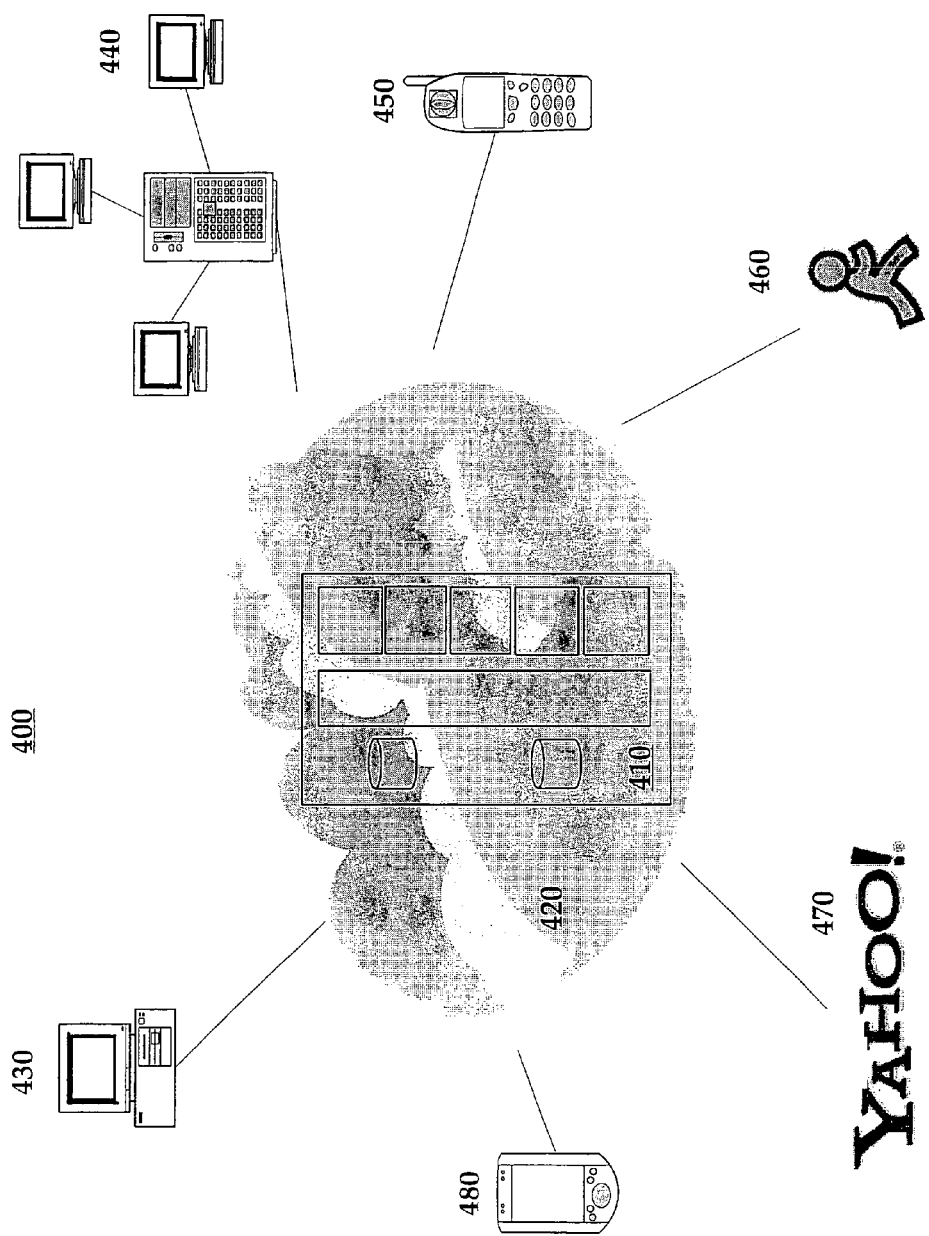
FIG. 4 is an illustration of exemplary networked relationships amongst a variety of sources of PIM data and a data aggregation server.

In an embodiment of the present invention, data aggregation server 210 may be operating on and/or integrated with a service provider network (e.g., Cingular Wireless for wireless networking or SBC Communications, Inc. for telecommunications such as digital subscriber lines (DSL)) as is further described in FIG. 4. Through integration or operational contact with a service provider's network, instant access to a community of millions of subscribers (i.e., the service provider's customers) is provided. This integration may also allow for access to additional features such as news, media content, maps and directions as well as e-mail, Short Messaging Service (SMS) and any other value-added features as made available by the service provider. The service provider's network and the data aggregation server 210 may operate independently of or in conjunction with enterprise server architecture 230 and/or PC 240.

As noted above, the data aggregation server 210 may also be integrated with the communication management system (110) and/or management server (145) of FIG. 1. In that regard, data aggregation server 210 may be a part of the management server (145), which may be an operational part of the communications management system (110) of FIG. 1. That communication management system (110) may be a part of the aforementioned service provider network and is further described in FIG. 4.

Figure 3:
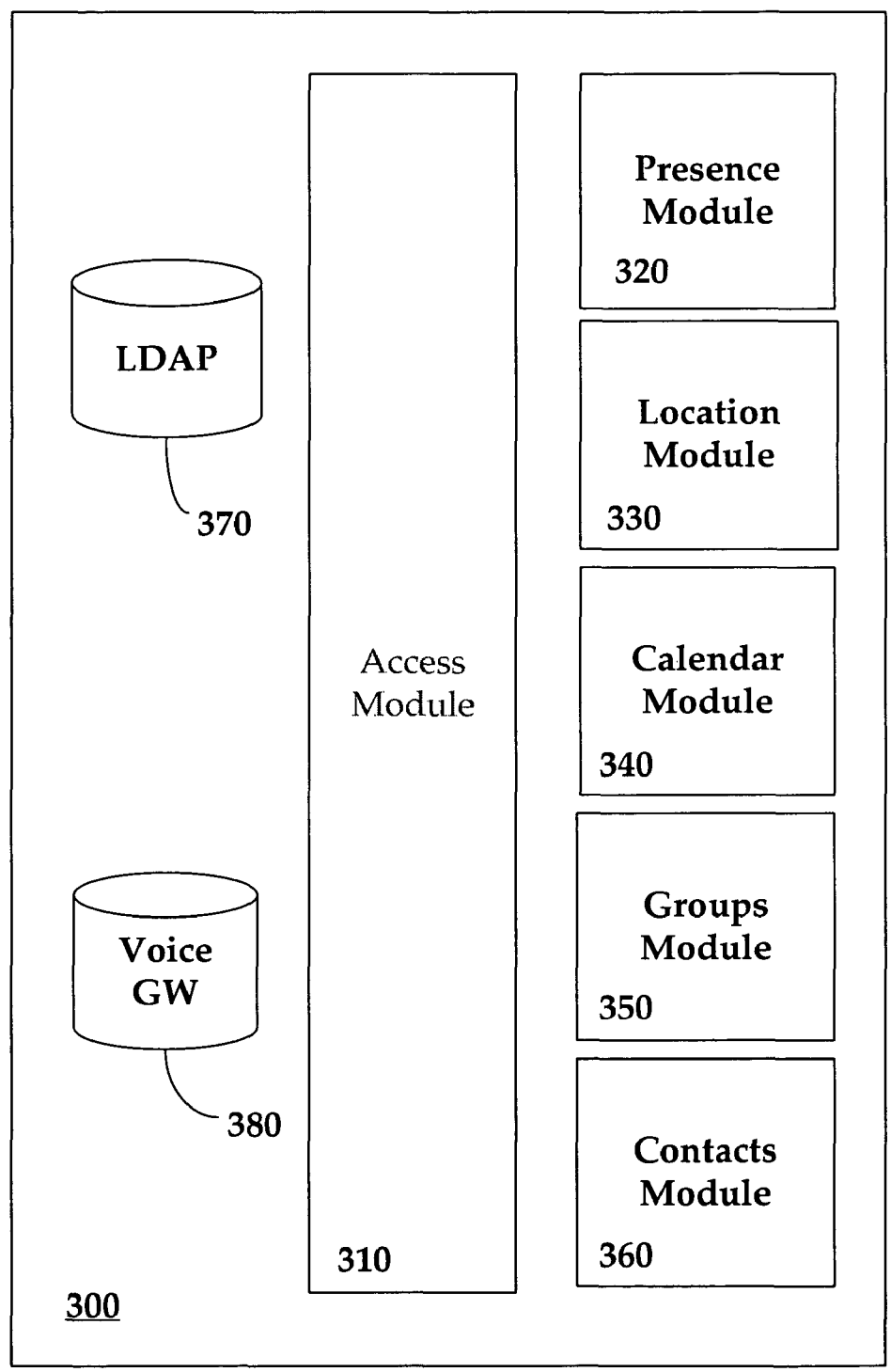
FIG. 3 is an exemplary data aggregation server providing for aggregation and management of PIM data.

Data aggregation server 210 may comprise various access controls, gateways and operational modules, which are described in detail in FIG. 3.

Intermediate operations and services 250 may comprise any variety of operations and services deemed necessary and/or desirable by a service provider. In FIG. 2, an SMS Gateway 270, IP/SIP Gateway 280 and Billing and Transaction Service 290 are illustrated. The inclusion of these particular operations and services is not to suggest their presence is a prerequisite for practice of the presently clamed invention.

SMS Gateway 270 may comprise a software and/or hardware utility enabling users to send and receive SMS messages on a GSM or PCS digital cellular network. SMS Gateway 270 may support a number of IP interfaces such as POP3 and SMTP for integration with an e-mail environment as well as HTTP/XML interfaces and SNMP traps for notification of events. SMS Gateway 270 may further support local programming interfaces such as Object Linking and Embedding (OLE), Dynamic Data Exchange (DDE) and Command Line Interface (CLI). SMS gateway 270 may be further coupled to an SMSC (not shown). A Push Gateway may be functionally integrated with SMS Gateway 270 and may further operate proxy applications such as a WAP Gateway for the translation of WAP requests into HTTP requests.

An IP/SIP Gateway 280 may operate in conjunction with an SIP Stack located in client device 220 to integrate the PSTN, which uses the Signaling System 7 protocol to offload PSTN data onto a wireless or broadband network.

Billing and transaction service 290 may be configured and/or utilized for calculating the minutes a user is on a network and/or the amount of bandwidth the user has consumed and how this usage pertains to a service plan and/or billing cycle. Other features that may be utilized by the user of client device 220 and subject to a service fee may be calculated by billing and transaction service 290 such as SMS, roaming and 411.

Client device 220, in an embodiment of the present invention, is a mobile device such as a cellular telephone configured to allow access to the data aggregation server 210 as well as data in enterprise server 230 and/or PC 240. Client device 220 may operate through intermediate operations and services 250 in order to access the data management server 210. Client device 220 may comprise various authentication controls and operational modules that interact with certain modules in the data aggregation server 210, the intermediate operations and service 250 as well as an enterprise server 230 and/or PC 240.

FIG. 3 is an exemplary data aggregation server 300 providing for the aggregation and management of PIM data such as personal and professional contact and calendar information.

A module, as referenced in the present invention, is a collection of routines that perform various system-level functions and may be dynamically loaded and unloaded by hardware and device drivers as required. The modular software components described herein may also be incorporated as part of a larger software platform or integrated as part of an application specific component.

The modules of the present invention, in one embodiment, actively seek out data. That is, the modules recognize the existence of certain data connections to PIM data and other informational stores at mobile devices, desktop PCs, enterprise servers and any computing device coupled to the data aggregation-server 300. Client software may be utilized at these different data stores to enable the access to information and to provide for certain authorization/access exchanges as are discussed in, for example, the context of access module 310. The data aggregation server 300, via the appropriate module (e.g., presence module 320) and/or modules (e.g., presence module 320 in conjunction with access module 310) will attempt to contact a client or some other indicia (e.g., an IP address) reflecting the existence of PIM or other informational data and try to acquire the same.

In another embodiment of the present invention, the data aggregation server 300 (via its various modules) may actually attempt to establish a data connection when a connection is not in existence. For example, if an enterprise server closes a TCP/IP connection to preserve bandwidth, the data aggregation server 300 may attempt to (re)establish that data connection in order to acquire certain PIM or other informational data.

In yet another embodiment of the present invention, the aforementioned clients or other software associated with the data management server 300 may attempt to push PIM and other informational data directly to the data aggregation server 300. For example, a desktop PC may be configured with client software allowing for interaction with the data aggregation server 300. The desktop PC client may recognize the existence of certain PIM or other informational data such as calendar and contact information. In an embodiment of the present invention, that client may push the PIM and other informational data to the server.

Limitations may be imposed on the clients with regard to what information may and may not be pushed. For example, certain information may be designated of low importance/privacy and freely pushed to the data aggregation server 300. Other information may be designed of medium importance and require, for example, the authorization of a user before that information is pushed to the data aggregation server 300. Still further information may be designated high priority/importance and never be pushed to the data aggregation server 300 due to privacy concerns. Similar limitations may be imposed in a pull scenario wherein the various modules of the data aggregation server 300 seek out that information and pull the information from an associated information source such as a desktop PC.

In another embodiment of the present invention, a client operating at, for example, a desktop PC may push certain information to a mobile device. That mobile device may then push the same information to the data aggregation server 300. Similarly, that information may be pulled from the mobile device after having been pushed from the desktop PC.

The present invention does not intend to limit the means by which information is acquired (e.g., push or pull), the existence or non-existence of intermediaries (e.g., data pushed from a desktop PC to a mobile device to a data aggregation server 300) or any security policy that may or may not be in place with regard to the aggregation of PIM and other informational data. A single data aggregation server 300 may further utilize various data acquisition methods for different types of data. For example, the data aggregation server 300 may actively seek to acquire location information via a location module 330 but may accept the pushing of data as it pertains to calendar and/or contacts data.

The modules of the present invention, in addition to aggregating information, may also manage the data. That is, the modules may analyze certain data in order to generate further data as is discussed in the context of a location module 330 and presence module 320, below. The various modules of the present invention may further execute certain calls and commands as they pertain to storage and retrieval of aggregated data, which may be stored locally (e.g., at the data aggregation server 300), in a storage area network (SAN), at a remote location or in any other medium or apparatus suitable for storage of data and accessing the same. Management (e.g., storage) of data may also be executed by other modules of the data aggregation server 300 (not shown).

Aggregated data may be further stored at a client device 220 whereby the data aggregation server 300 pushes relevant data (e.g., data pertaining to PIM data of the user) to the client device 220 upon availability of the relevant data or, alternatively, relevant data is acquired and pulled upon request of the user for particular data or updated data. In some instances, the data aggregation server 300 will maintain certain portions of data in order to allow certain modules to analyze certain data in order to generate further data.

Storage of the aggregated data may be subject to various security protocols that may be set by the origin of the data (e.g., a user may designate their PIM data to expire so many hours after acquisition or the data may be prohibited from storage on any device or a particular device for more than a particular period of time). Alternatively, an administrator of a particular network or a particular communications architecture (e.g., an enterprise server or a larger communications network) may implement various security limitations. Limitations and/or requirements of the storage of data may be subject to any variety of privacy, security and/or performance reasons.

By further example, in the case of contact information (e.g., names and addresses), the data aggregation server 300 may pull contact information from an Internet portal such as Yahoo!®, from a Microsoft®Exchange® Server and/or from an address book in a mobile device (e.g., client device 220). Alternatively, the client device 220, in conjunction with data aggregation server 300, may synchronize the aforementioned data sources. In this example, the data aggregation server 300 may only retain certain information (e.g., meta data) as that information passes through the server 300 and as that information pertains to identifying and developing potential links between various users of the data aggregation server 300.

In the case of calendar data, for example, that data may be pulled from various data sources (as described above) or may merely be synchronized (as also described above). The calendar data may be immediately pushed from one point (e.g. a desktop) to another (e.g., authorized users) wherein the data aggregation server 300 only retains information pertaining to open-meeting times for the purpose of scheduling or it may store nothing at all.

In the case of content such as pictures, blogs, and photographs as may be acquired from Internet portals or websites on the World Wide Web, that content may be immediately pushed to authorized and/or requesting users as the size of the content would likely degrade performance of the data aggregation server 300.

Access module 310 comprises or is otherwise coupled to the software, routines, hardware and/or driver devices necessary to control who and what has access to the data aggregation server 300 and the PIM data and other information aggregated and managed by the data aggregation server 300. Access module 310 may be configured to grant or deny access based on, for example, who is making the access request (e.g., a particular user), where the request is coming from (e.g., location as may be determined by a base station or GPS), when the request is occurring (e.g., time of day), what is making the request (e.g., a mobile device) and how the connection is being made (e.g., SSL)

Access module 310 may utilize a user name/password combination to authenticate a user requesting access. A list of users and/or groups with access to the data aggregation server 300 may be created and stored in an LDAP database controlled by LDAP module 370. This database of groups and users may be installed locally or a reside at a remote machine, a storage area network or any other device/medium at any location so long as it is suited for the maintenance and access of user access data.

Access module 310 may further utilize SSL authentication whereby a user's identity is confirmed by a security certificate. If the certificate is from a trusted authority, then the certificate is mapped to a user's entry in a certificate mapping file. If the certificate maps correctly, access is granted subject to specific rules set for that particular user (e.g., access control lists and access control entries). If the certificate is not from a trusted authority or fails to map properly, authentication fails and access is denied.

Access module 310 may utilize other access control methodologies such as Host-IP access control wherein access is limited or denied to specific clients as specified by hostnames or IP addresses of allowed or blacklisted clients. Wildcard patterns may be used to control access as it pertains to, for example, entire networks.

Access module 310 may further interoperate with presence module 320, location module 330, calendar module 340, groups module 350 and/or contacts module 360 to allow for acquisition of PIM data and other information from multiple sources including desktop PCs, Internet Service Providers, web portals and work directories as is illustrated in FIG. 4 below.

Presence module 320 comprises or is otherwise coupled to the software, routines, hardware and/or driver devices necessary to identify the availability of various subscribers or users of the data aggregation server 300. That is, presence module 320 helps identify who is presently available and through which particular contact methodology they may be contacted.

For example, through application awareness (e.g., a calendar or calendar module 340), presence module 320 may determine that a user is presently in a meeting and therefore unavailable (i.e., not present). Alternatively, presence module 320 may, as a result of a manual setting by a user communicatively coupled to the data aggregation server 300 (e.g., a data connection from a desktop PC), determine that a user is available only through a particular contact methodology and display that information as is appropriate (e.g., available—present—via phone and e-mail).

A second user connected to the data aggregation server 300 via, for example, a mobile device may—as a result of information aggregated and made available by presence module 340—ascertain the present unavailability of a first user in their office (i.e., their presence PIM reflects they are out of the office) and, instead, contact that user on their cellular phone where their presence is currently and affirmatively identified.

Various types of presence may be reflected by the presence module 320. Instant messaging, e-mail, home phone, office phone, cellular phone, SMS, pager and any other form of communication device capable of reflecting availability or unavailability are within the scope of the type of presence information aggregated and managed by presence module 320.

Location module 330 comprises or is otherwise coupled to the software, routines, hardware and/or driver devices necessary to identify the physical location of a subscriber or user of the data aggregation server 300. Location module 330 may be utilized in the context of a GPS enabled mobile device although such functionality is not necessary for the practice of the present invention.

For example, location module 330 may determine that a particular user is presently working at their computer in their office as a result of querying information managed by the presence module 320. Through other modules or applications (e.g., an address book), location module 330 may determine that the user's work address is located at 901 Marshall Street, Redwood City, California. In this way, the location module 330 may make intelligent determinations of data even though certain information may not be directly provided to or aggregated by the module. Information can also be generated or aggregated without the requirement of the aforementioned GPS functionality.

Location module 330, through integration with a third-party system or built-in features present or coupled to the data aggregation platform 300, may also aggregate information to be utilized in the context of location information. For example, the location module 330 may aggregate the necessary data to provide text or visual directions to a particular user as it relates to aggregated location information.

Location module 330 may be further configured to make direct queries of users as to their location or to analyze information as provided by cellular base stations as to general locations of users.

Calendar module 340 comprises or is otherwise coupled to the software, routines, hardware and/or driver devices necessary to aggregate calendar and scheduling information of subscribers or users of the data aggregation server 300 and any metadata that may be associated with the same.

Calendar module 340 may seek to aggregate calendar information from a variety of sources of a particular user, for example, a mobile device or handheld calendar and a calendar integrated with a desktop PC or enterprise server. The aggregation of calendar data by the calendar module 340 may aid in providing on-the-go synchronization of calendar information. As calendar information constantly changes and provides the greatest possibility for conflict (i.e., two disparate events at two different data stores for the same time period), an embodiment of the present invention continually aggregates calendar information for 'as soon as possible' availability and/or manipulation via calendar module 340.

The aggregation of calendar data may be provided as part of a specific request to view that information. For example, a user may seek to access calendar information at a desktop PC via their mobile device. That calendar information may be aggregated by the calendar module 340 in addition to being conveyed to the client via a pull operation to the data aggregation server 300 and a subsequent push to the mobile device client. In another embodiment, the calendar information may be pulled from the desktop PC or enterprise server all the way to the mobile device client with a copy of the calendar data being cached by the calendar module 340 as it passes through the data aggregation server 300, which may be integrated a communication management system like that described in FIG. 1.

Similarly, calendar data generated at a mobile device may be aggregated by the calendar module 340 via a pull command at the data aggregation server 300 or via a command issued by a desktop PC. Calendar data may also be pushed directly to the calendar module 340 as a result of certain behavior at the mobile client (e.g., the entry of new calendar information followed by a synchronization operation or a regularly scheduled aggregation operation by the data aggregation server 300. In this way, changes in calendar data that truly occur 'on the go' may be aggregated for subsequent synchronization and/or distribution as is appropriate.

Calendar module 340 may further interoperate with presence module 320 to help provide indicia of presence. For example, a presence indicator may normally be manually set by a user (e.g., 'I am Available' or 'I am Not Available'). In the event that a user fails to provide such a manual setting and the user is unavailable, the user's presence setting may be misleading thereby resulting in other users attempting to contact the user but to no avail thereby defeating one of the purposes of a presence indicator. When the calendar module 340 operates in conjunction with the presence module 320, certain calendar information as aggregated by the calendar module 340 may aid in generating a more accurate indicator of presence as provided by presence module 320. For example, the occurrence of a meeting in a calendar would indicate that a user is unavailable. The presence module 320 may then adjust in light of this aggregated calendar data and make an appropriate reflection of the same. When the meeting ends, presence indicators may be readjusted as is appropriate.

Like all of the PIM data aggregated by the present invention, certain information may be allocated a different degree of privacy or importance. For example, different meetings may be of different importance—that is, the meeting may be of critical importance (e.g., a major merger or acquisition) or of lesser importance (e.g., a company presentation on the new credit union membership). Based on metadata embedded in the calendar data (e.g., 'must attend' or 'important'), additional data is acquired by the calendar module 340, which may then be shared through data distribution or utilized by other modules of the present invention.

Metadata embedded in the calendar data and recognized by the calendar module 340 may also be utilized to reflect additional information not necessarily expressly provided by that calendar data (e.g., in a subject description). For example, calendar module 340, through data aggregation, may determine that while a meeting does not begin until 2.00 PM, because of a 'travel required' metadata indicator, any sharing of this calendar information would reflect that an attempt to schedule a meeting with that user during their 'travel time' would be ill advised despite the fact that the calendar might otherwise reflect availability. In some embodiments, metadata reflecting the need to travel and information relating to the address of the meeting (as expressly provided by the calendar entry or as may be obtained through other applications or aggregated information), may allow for the utilization of mapping technologies to provide a more accurate indicator of the exact travel time required and, as a result, more accurate information to be distributed by the data aggregation server 300.

Numerous metadata indicators may be available to be embedded in calendar data and acquired by the data aggregation server 300 via the calendar module 340, for example: none, important, business, personal, vacation, must attend, travel required, needs preparation, birthday, anniversary, phone call, free, tentative, busy, out of office. Additionally, in an embodiment, a user may be able to generate their own personalized metadata and provide associate rules with regard to the same.

The calendar module 340 of the present invention, in an embodiment, may aggregate information from both personal and professional calendars. The calendar module 340 of the present invention may further aggregate information pertaining to the availability of conference rooms or conferencing equipment. The calendar module 340 may manage aggregated calendar data and take into account time zone differences in calendar data as may later be distributed to users of the data aggregation server 300. For example, the calendar module 340 may make determinations that 1.00 PM calendar information for a user in California translates into different information when accessed by a user in the United Kingdom. Calendar module 340 may further interoperate with the presence module 320 to make determinations of locations and automatically make the appropriate time zone calculations and/or adjustments when aggregating and/or distributing information.

Groups module 350 comprises or is otherwise coupled to the software, routines, hardware and/or driver devices necessary to form groupings of different users or subscribers of the data aggregation server 300. Groups information acquired and generated by the groups module 350 may be explicit like a ListServ; for example, add user A to group X. Groups may also be implicit and generated as the result of intelligent determinations made by the groups module 350.

For example, the groups module 350 may determine that users A, E and G are all employed by Big Co. and will create (if the group does not already exist) and/or add users A, E and G to the Big Co. group list. The groups module 350 may further determine that users B, C and D are all graduates of State University and create and/or add them to the State University group list. The groups module 350 may further determine that users F, H and I are all members of Professional Organization and create and/or add them to the Professional Organizations list. Furthermore, the groups module 350 may determine that users J, K and L are all Family Members and add them to the Family Members list.

Users may be members of more than one group as generated by the groups module 350. For example, user J could be could be a Family Member and also an alumnus of State University thereby warranting their presence of both the Family Members and State University List. Users may be members of only one group. Users may not belong to any group.

Groups may be identified and/or generated as a result of acquiring data from various sources. For example, a Global Address List (GAL) may represent a comprehensive list of e-mail addresses, fax and telephone numbers, and mail stops for the employees and contractors for a particular company. In addition to being a raw source of contact data, the GAL could in and of itself be the basis for generation of a group (e.g., Company Group List).

Contact data aggregated by a contacts module 360 may be categorized and grouped by the groups module 350, may be manually entered (e.g., input by a user) or obtained through a synchronization operation. In any of these instances, the groups module 350 is configured to aggregate the new information and group it properly.

As noted, contact data as aggregated by the contacts module 360 may be implemented by the groups module 350. For example, if the groups module 350 determines that it has incomplete data for a member of a group or a contract entry in general, the groups module 350 may actively seek that member/user's absent information through, for example, accessing a GAL or even an LDAP database comprising user information or another operation in conjunction with the contacts module 360.

Contacts module 360 comprises or is otherwise coupled to the software, routines, hardware and/or driver devices necessary to aggregate contact information from different sources of contact data. While the most common sources of contact PIM data are address books or contacts lists, the contacts module 360 may aggregate data through intelligent operations wherein elements of contact information are identified and more complete information is aggregated for the purpose of generating a more accurate and complete contact profile.

For example, the contacts module 360 may determine that User A contacted the present subscriber via a telephone call but the name and e-mail address of User A is not available—only their phone number. The contacts module 360 would then seek that absent information from various sources such as local directories, username/password stores, the Internet, contact lists of other users, corporate personnel directories or any other sources of information that might link the phone number to more identifying information for use in a contacts profile. Similar queries could be made based on received and sent e-mails or any other indicia of contact or interaction by the user (e.g., SMS and instant message).

The contacts module 360 may further query other information networks and/or data aggregation platforms (e.g., a platform embedded in the network of a separate service provider but with whom the present service provider has an informational sharing agreement) to determine the identity of User A. The contacts module 360 could also directly query the user for the missing information through, for example, an SMS message requesting the information be entered at the mobile device or a desktop PC.

Contact information may also be acquired from various other applications. For example, and as noted above, the receipt of an otherwise unknown phone number can begin the acquisition of contact information such as name, physical address and other identifying contact information (e.g., company, title, etc.). Information may also be obtained from e-mail headers whereby a domain name (e.g., @company.com) may be traced to a particular company or from the body of an e-mail through an e-mail signature or footer. Similarly, instant messages—as a form of contact—may be utilized to generate a profile or parts thereof. Outgoing phone calls, e-mails and SMS messages can be used in a similar fashion.

Calendar data may also be used to acquire contact information as it pertains to, for example, a corporate/work address (e.g., 10 AM meeting at SEVEN Networks, Inc. at 901 Marshall Street, Redwood City, Calif. 94063) of a particular person. Based on that calendar data, the contacts module 360 may determine that the 10 AM with Person X was at Person X's place of employment: SEVEN Networks, Inc. and generate appropriate contact information and profile data concerning employer and business address. In this way, the employment and address information of Person X can be populated without an express input of that information into a particular user/contact profile having ever been made. Similarly, anniversaries, birthdays and other repeating and/or important dates can be associated with particular contacts.

Contact information—and another PIM data for that matter—may be obtained from other profiles of users of the data aggregation server 300 subject to privacy and security profiles. For example, User A may have a complete profile indicating name, phone number, address, employment and e-mail information. User B's profile may only designate employment information, specifically, the name of their employer. The contacts module 360 of the data aggregation server 300 may, by matching the employment information of Users A and B, populate other fields in User B's profile. For example, User B's profile with regard to a general phone and fax number as well as corporate address can be populated as User B works for the same company as User A, that same information being fully present in the contact information/data profile for User A.

It is envisioned that in some embodiments of the present invention, various Internet spiders or web scraping technologies may be utilized by the contacts module 360 to further acquire presently unavailable information. In such an embodiment, a web scraping module (not shown) could further identify a particular contact/user profile and search various websites for information and news pertaining to that person. If it is determined, during spidering, that this particular person has changed jobs, been promoted or been subject to some other event of news-worthy importance, the contacts module 360 may update certain contacts information/profile data.

LDAP module 370 is a TCP/IP software protocol enabling users to locate organizations, individuals and other resources in an open or proprietary network (e.g., look-up queries). LDAP module 370 makes it possible for almost any application running on virtually any platform to obtain directory information, service data and public keys. LDAP module 370 may be based on the X.500 open standard whereby applications need not worry about the type or location of servers hosting the queried directories. LDAP module 370 may further identify user privileges on a network.

Voice gateway 380 terminates PSTN traffic from callers. Voice gateway 380 may comprise an automated speech recognition engine (not shown) to perform speech recognition; a dual tone multi-frequency (DTMF) module (not shown) for recognition of key tones; and audio playback and record components (not shown). Voice gateway 380 may further comprise a Voice Extensible Markup Language (VXML) interpreter (sometimes referred to as a voice interpreter) (not shown) for interpreting VXML markup, playing synthesized speech and/or listening for user responses in the instance of automated speech recognition.

Other modules may be introduced to the data aggregation server 300 so long as they do not interfere with the aggregation and management of PIM data from various sources such as an enterprise server or PC or those other sources as exemplified in FIG. 4 below.

FIG. 4 is an illustration of exemplary networked relationships 400 amongst a variety of sources of PIM data (430-480) and a data aggregation server 410 as may be found in the present invention.

Data aggregation server 410 is an aggregation server like that described in FIGS. 2 and 3 and as may be integrated with or otherwise communicatively coupled to a service provider communications network 420 (e.g., Cingular Wireless or SBC Communications). The data aggregation server 410 is coupled to various sources of PIM data such as PCs 430, enterprise servers 440, mobile phones 450, instant messaging networks 460, ISPs 470 or other information sources such as PDAs or Smartphones 480.

While FIG. 4 reflects direct connections between the data aggregation server 410 (via service provider communications network 420) and these various sources of PIM data 430-480, this is not suggest the requirement or existence of a point-to-point or direct connection. For example, mobile phone 450 will be connected to the data aggregation server 410 through not only the service provider communications network 420 in addition to a variety of base stations and other intermediate communications networks (not shown). Similarly, a computer network as provided by PC 430 or enterprise server 440 will comprise a series of routers between the source of information (e.g., the PC 430) and the data aggregation server 410. Similarly, an Internet portal 470 like Yahoo!® or an IM network 460 like that offered by America Online™ will comprise a series of gateways, servers and/or other intermediate software and/or hardware before becoming communicatively coupled with the local and wide area networks that will further couple the Internet portal 470 or IM network 460 to the data aggregation server 410 via the service provider communications networks 420.

PC 430 may be any type of home computing device; for example, a desktop computer or a laptop computer like PC 130 in FIG. 1. PC 430 may be coupled to data aggregation server 410 via an ISP such as SBC Communications, which provides DSL service or a dial-up service provider such as America Online™. The present invention envisions the use of a variety of communication channels for communicating between a PIM data source and the data aggregation server 410, for example, the aforementioned DSL and dial-up services as well as satellite and wireless communications. Other communication mediums may be utilized as well, such as Bluetooth or InfraRed. No limitation as to the use of a particular communication medium is meant to be imposed by the present invention nor is there meant to be the requirement of a homogeneous communication link between the PIM data source and the data aggregation server 410 (e.g., there need not be—nor will there usually be—a single DSL link all the way between PC 430 and the actual data aggregation server 410).

PC 430 may be equipped with connection software allowing for the establishment of a data connection between the PC 430 and a communications management system (like that described in FIG. 1) whereby data may be synchronized with an associated mobile device (e.g., mobile device 450). Such a data connection may allow for the redirection of, for example, e-mail and mobile access to PIM data residing in a memory store at the PC 430.

Enterprise server 440 shares similarities to PC 430 with the exception that the enterprise server 440's architecture is more complex with regard to the introduction of not only the server but often a series of additional application servers, data stores and work stations that may resemble (or be the same as) a computing device like PC 430. Enterprise server 440 may be exemplified as a Microsoft® Exchange Server or a Lotus® Domino Server from IBM to manage the receipt, storage, delivery and access to e-mail as well as other application and PIM data. An enterprise server generally serves a larger group of users via a server-client relationship whereas a single PC (e.g., a home computer) generally serves an individual user. Enterprise server 440 may also comprise a software connector allowing for redirection and access to e-mail and other corporate data to an associated mobile device (e.g., mobile device 450) via a communications management system like that described in FIG. 1.

Mobile device 450 may be a cellular device allowing for Internet or other data access whereby a data connection with a communications management system (like that in FIG. 1) and/or data aggregation server 410 may be established. In an exemplary embodiment of the present invention, the network architecture and service provider communications networks 420 of a mobile service provider may be directly integrated with the data aggregation server 410 of the present invention. Data aggregation server 410 may also be integrated with other network operators (e.g., shared by a plurality of service providers) or communicatively coupled to another service provider communications network 420 comprising its own data aggregation server 410 (e.g., a data aggregation server in the Cingular Wireless network may be coupled to a data aggregation server in a Sprint PCS network).

IM network 460 provides the necessary functionality (e.g., hardware and software) to allow for real-time, text-based conferencing over the Internet or another communications network between two or more people. Many IM providers now offer the integration of still-images, avatars, audio clips and, in some instances, video clips as a part of the IM experience. IM network 460 may also provide a series of contact lists or 'buddy lists' that function as a source of contact information (i.e., PIM data) utilized by the data aggregation server 410 and, more specifically, a groups module as described in FIG. 3. An example of an IM network service provider is America Online™. America Online™ provides instant messaging not only to America Online™ dial-up service subscribers but also as an independent application that may be downloaded and installed on a desktop computer (e.g., PC 430) or, as is increasingly common, a mobile device (e.g., mobile device 450).

Internet portal 470 may be a single point for the access of information over the Internet, specifically, the World Wide Web. Yahoo!® is an example of an Internet portal 470 that provides a comprehensive single point of access for, conceivably, any information the average individual would need from the World Wide Web; for example, a search engine, maps, news, weather, e-mail, calendaring, various other forms of PIM data and so forth. Consistent with being a single offering, Internet portal 470 may offer a variety of other services including instant messaging (e.g., Yahoo!® Messenger) or even Internet access (e.g., Yahoo!®/SBC.® DSL). By logging on with a user ID and password, Internet portal 470 may also allow for the generation and customization of personal pages wherein the user can request the delivery of and direct the layout of particular information, including PIM data.

For example, a particular user may want headline news pertaining only to the San Francisco area but also desires weather reports in Sunnyvale, Calif., and San Francisco, Calif., as the user might live in one location and commute to the other for work. Similarly, the user may be a transplant from the East Coast and still actively follow sports teams on the East Coast. As such, the user may further organize their personal page to display sports scores concerning the Boston Bruins hockey team and the Boston Red Sox baseball team instead of information concerning the San Jose Sharks and San Francisco Giants, which might otherwise be logically displayed in the context of news and weather for the San Francisco region.

As noted, certain information may be utilized in the context of identifying and generating PIM data aggregated by the data aggregation platform 410. For example, a personal calendar displayed on the user's personal page; an address book linked to the user's personal page and so on PDA 480 may be a portable device offering, for example, notepad and calendar/scheduling functionality. PDA 480 may have certain network functionality to allow for data exchanges with other PDAs or compatible devices as well as a larger communications network enabling synchronization with a home or work computer where a companion calendaring program may be installed. Many PDA functionalities have been incorporated into the likes of mobile device 450 or smart phones.

The various aggregation modules of the data aggregation server 410 may acquire data from these various information sources of PIM data through integration with a particular data source. For example, the data aggregation server 410 may be integrated or configured to access and operate with an instant messaging network 460 like that offered by America Online. That is, America Online and a service provider implementing the data aggregation server 410 may reach an agreement allowing access of the data aggregation server 410 to the instant messaging network 460 thereby providing near unfettered access and certain sharing of information between the two systems as a result of systematic design. Once the data aggregation server 410 is implemented/integrated with, for example, the instant messaging network 460, data aggregation may commence unabated as the data aggregation server 410 operates as if it is a normal operating presence in the network.

The various aggregation modules of the data aggregation server 410 may also act as a proxy with the proper user credentials to access a particular information network. For example, the data aggregation server 410 may be provided by certain user name and password information to access an Internet portal 470 like Yahoo!®. That is, a user of the services offered by the data aggregation server 410 would provide their user name and password to the data aggregation server 410, most likely during a registration or subsequent account update procedure. Thus, any time the data aggregation server 410 seeks to access the Yahoo!® Internet portal 470 to acquire information from, for example, an online/webpage calendar, the user's username and password will be provided to the Yahoo!® Internet portal 470 just as if the user were sitting in front of a keyboard and display and manually entering the information. Once access is granted to the Internet portal 470, aggregation of information may commence.

In some instances, various authentication tokens or cookies might be granted by various PIM data sources either as the result of a request to access certain PIM data or as a result of a correct username/password combination. Various security methodologies as discussed in the context of, for example, access module 310 (above) may also be applicable with regard to establishing credentialed relationships between the data aggregation platform 410 and various sources of PIM data.

In some instances, a combination of data aggregation methodologies may be necessary. For example, a username and password may be used for certain PIM data sources. In other instances, system integration may be required.

The data aggregation server 410 also provides for the aggregation of data from amongst different users of the service. For example, one user may provide his various user names and passwords in order to access certain PIM information stored in that particular users different PIM sources such as an instant messaging network 460 or an Internet portal 470. But aggregating one user's information does not help to create a network of information. In order to build a larger informational community, access to other user's PIM data is required. But while an instant messaging network 460 may allow the data aggregation server 410 access based on system integration or username/password combinations (either directly or by proxy), any secure system will be unlikely to allow a first user to access a second user's information without some sort of permission.

While that permission may be explicitly granted by another user (e.g., User B grants User A to access their information at instant messaging network 460), such an arrangement is unlikely because of security and privacy concerns of both the instant messaging network 460 and the user. For example, a user may have no qualms about granting another user information about certain information on an instant messaging contacts list (e.g., professional colleagues with whom both users interact in the office) but will likely be hesitant to share information concerning family members or other personal relationships. Control of who receives what information can cause the implementation of an entire new layer of security or management software that the instant messaging network 460 may be hesitant to implement because of costs or other concerns.

Such a concern is the fact that most instant messaging network (like America Online) are not in the business of providing an open network. That is, these services provide an instant messaging service to individual users and subscribers and it is up to those individual users to determine who knows who is on their contacts list; that is, America Online will not provide that information to other users. While data representative of that information may be stored by the instant messaging service that service will likely make every effort to keep that list secure and private from all other users. The service provider offering means to share or network this contact or other PIM data is unlikely due to, at the least, privacy and business/commercial relations in the marketplace.

The present data aggregation server 410 overcomes this hesitancy of different PIM data sources to openly share information. For example, User A and User B are both members/users of the data aggregation server 410. User A may provide certain security information to the data aggregation server 410 in order to access the aforementioned instant messaging network 460. In this way, User A can aggregate PIM data from his instant messaging network account (e.g., members of his contacts lists, those members instant messaging IDs and so forth). User A will unlikely have immediate access to similar PIM information held in an account assigned to User B for at least the reasons discussed above. Notwithstanding, User B will have provided certain security information to the data aggregation server 410 to allow the collection of PIM data in his account.

While an instant messaging network 460 may not be obliged to provide a system for sharing PIM data amongst its users, the present data aggregation server 410 does provide such interactions. User A will set up certain permissions with the data aggregation server 410 to allow User B to access User A's PIM data. User B will provide similar permissions such that User A may access User B PIM data. The permissions system of the data aggregation server 410 also allows for setting of limitation on who may access what information. Therefore, User A may allow for User B to access his contacts information—but not his calendar information. Similarly, User B may allow User A access to his calendar information but not his presence information. Permissions may be assigned to individuals via, for example, contacts module 360 or to groups of individuals as may be determined by the groups module 350. In one embodiment of the present invention, a permissions module (not shown) may govern these relationships. In another embodiment, such permissions may be governed by the access module 310.

Sub-permission levels may also be set in the data aggregation server 410. For example, User A may be able to access User B's calendar information—but only particular aspects of his calendar information as may be governed by, for example, metadata. Similar limitations may be set with regard to other PIM data (e.g., access only to personal contacts and not professional contacts).

The shared PIM data (via permissions) of the data aggregation server 410 enables the creation of a growing network of contacts and relationships. For example, User A may know User B; User B, in turn, may know User C. As a result of this single-degree of separation, User A may now have access to User C's contact information. Additional permissions may be set with regard to how many degrees of separation information is shared (e.g., only with persons on my contact list or with persons on the contact lists of persons on my contact list).

Additional permissions may be imposed with regard to aggregating data to complete incomplete data records. For example, User A may have an entry for John Doe but no phone number for John Doe. User B, however, may know John Doe as well and have a complete data entry (e.g., name, phone, address, birthday, etc.). Permission settings may be established wherein the data aggregation server 410, on behalf of User A, accesses the data of User B to gather the remainder of this contact information (e.g., phone number). While User A may now have a complete data record for John Doe, he may be entirely unaware of the source of that information. That is, User A may now know that information was aggregated from PIM data of User B or that John Doe is on User B's contacts list.

Access to various PIM data of other users by the data aggregation server 410 occurs as a result of the operation and interaction of various modules within the data aggregation server 410.

In this way, certain protocol limitations may also be overcome in that it is not necessary for User A (who might be a Yahoo!) user to directly communicate with an America Online system for the purposes of acquiring information about User B. User B, instead, directly interacts with the America Online system and then User B shares that information with User A in a common protocol.

Notwithstanding the protocol particularities of certain networks or PIM data sources, the present invention may, in an embodiment, utilize whatever protocol is necessary to communicate with that network/PIM data source in a way that the particular network/PIM data source will understand communications from the various modules of the data aggregation server 410. For example, the present invention would communicate with the Yahoo!® Internet Portal with regard to e-mail using IMAP. The present invention would communicate with a Microsoft® Exchange® Server using MAPI and so on. Distribution of data, too, may require the use of multiple protocols. For example, TCP/IP for a standard data connection to, for example, a desktop computer but use of WAP for communicating with a wireless device. In that regard, the present invention may be multi-protocol based.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A data aggregation system comprising:
a data aggregation server configured to aggregate data from a plurality of users in a community of users, wherein the plurality of users are enrolled in the data aggregation system, the data aggregation server comprising at least one module stored in memory and executable by a processor to acquire data from available user data sources that are a part of an integrated data environment and from available user data sources that are outside the integrated data environment, wherein the data acquired from the user data sources outside the integrated data environment is acquired using proxied credentials, the data aggregation server further comprising a contacts module stored in memory and executable by a processor to:
query an available user data source to find data deemed absent by a module of the data aggregation server, and
add the found data to the data aggregated from the plurality of users, the data aggregation server further comprising a groups module stored in memory and executable by a processor to:
identify a common characteristic in the data aggregated from the plurality of users, and
generate a group of users in accordance with the common characteristic in the data aggregated from the plurality of users; and
a mobile device communicatively coupled to the data aggregation server, the mobile device configured to selectively access the data acquired from the available user data sources in response to a request by a requesting user.

2. The data aggregation system of claim 1, wherein the integrated data environment is a service provider network and the data aggregation server is implemented by the service provider as a part of the service provider network.

3. The data aggregation system of claim 1, further comprising a computing device coupled to the data aggregation server, the computing device associated with at least one of the plurality of users.

4. The data aggregation system of claim 3, wherein the computing device maintains personal information management (PIM) data of the at least one of the plurality of users.

5. The data aggregation system of claim 3, wherein the computing device is also communicatively coupled to the mobile device, the mobile device associated with the at least one of the plurality of users.

6. The data aggregation system of claim 3, wherein the computing device is a personal computer.

7. The data aggregation system of claim 3, wherein the computing device is an enterprise server.

8. The data aggregation system of claim 1, wherein the aggregation of data by the data aggregation server comprises a push operation initiated by one of the plurality of users.

9. The data aggregation system of claim 1, wherein the aggregation of data by the data aggregation server comprises a pull operation initiated by the mobile device.

10. The data aggregation system of claim 4, wherein the aggregated data comprises PIM data originating at the computing device.

11. The data aggregation system of claim 1, wherein the aggregated data comprises calendar data.

12. The data aggregation system of claim 1, wherein the aggregated data comprises contact data.

13. The data aggregation system of claim 1, wherein the aggregated data comprises presence data.

14. The data aggregation system of claim 1, wherein the aggregated data comprises location data.

15. The data aggregation system of claim 1, wherein the aggregated data comprises non-PIM data.

16. A method of aggregating data comprising:
querying an availability of data sources in an integrated data environment;
acquiring data from the available data sources in the integrated data environment;
querying an availability of data sources outside the integrated data environment;
providing proxied credentials to access the available data sources outside the integrated data environment;
acquiring data from the available data sources outside the integrated data environment;
aggregating the data acquired from the available data sources in and outside the integrated data environment at a storage medium coupled to a data management server, the aggregated data made selectively accessible to one or more users of the data management server in response to a request by a requesting user, wherein the data is made selectively accessible based on one or more request attributes identified in the request of the requesting user;
determining data that is absent from the aggregated data;
querying an available data source to find the absent data;
adding the found data to the aggregated data;
identifying a common characteristic in the aggregated data; and
generating a group of users in accordance with the common characteristic in the aggregated data.

17. The method of claim 16, wherein the available data sources outside the integrated data environment comprise a first user data source and a second user data source.

18. The method of claim 17, wherein a first user provides the data management server credentials to access the first user data source and a second user provides the data management server credentials to access the second user data source prior to the data management server querying the availability of available data sources outside the integrated data environment.

19. The method of claim 17, wherein the first user data source and second user data source are a common source of data.

20. The method of claim 19, wherein the common source of data comprises a personal computer, an enterprise server, a mobile device, an instant messenger network, or an Internet portal.

21. The method of claim 18, wherein the first user data source and second user data source are different sources of data.

22. The method of claim 21, wherein the aggregated data is shared between the first user and the second user as a result of the aggregation of data from the different sources of data.

23. The method of claim 16, wherein querying the availability of data sources outside the integrated data environment comprises the use of a communications protocol native to the data source outside the integrated data environment.

24. A computer-readable storage medium having embodied thereon a program, the program executable by a processor to cause a computing device to execute a method for aggregating data, the method comprising:
querying an availability of data sources in an integrated data environment;
acquiring data from the available data sources in the integrated data environment;
querying an availability of data sources outside the integrated data environment;
providing proxied credentials to access the available data sources outside the integrated data environment;
acquiring data from the available data sources outside the integrated data environment;
aggregating the data acquired from the available data sources in and outside the integrated data environment, the aggregated data to be made selectively accessible to one or more users in response to a request by a requesting user, wherein the data is made selectively accessible based on one or more request attributes identified in the request of the requesting user;
determining data that is absent from the aggregated data;
querying an available data source to find the absent data;
adding the found data to the aggregated data;
identifying a common characteristic in the aggregated data; and
generating a group of users in accordance with the common characteristic in the aggregated data.

25. The computer-readable storage medium of claim 24, wherein querying the availability of data sources outside the integrated data environment comprises the use of a communications protocol native to the data source outside the integrated data environment.

26. The computer-readable storage medium of claim 24, the method further comprising sharing aggregated data between a first user and a second user as a result of the aggregation of data from at least two sources of data outside the integrated data environment.

27. The data aggregation system of claim 1, wherein the one or more request attributes includes a location of the requesting user.

28. The data aggregation system of claim 1, wherein the one or more request attributes includes a time of the request.

29. The data aggregation system of claim 1, wherein the one or more request attributes includes a device used to make the request.

30. The data aggregation system of claim 1, wherein the one or more request attributes includes a connection used to make the request.

31. The data aggregation system of claim 1, wherein the one or more request attributes includes the identity of the requesting user.

32. The method of claim 16, wherein the one or more request attributes includes a location of the requesting user.

33. The method of claim 16, wherein the one or more request attributes includes a time of the request.

34. The method of claim 16, wherein the one or more request attributes includes a device used to make the request.

35. The method of claim 16, wherein the one or more request attributes includes a connection used to make the request.

36. The method of claim 16, wherein the one or more request attributes includes the identity of the requesting user.

* * * * *